US 6,643,086 B1

(12) United States Patent
Hiramoto et al.

(10) Patent No.: US 6,643,086 B1
(45) Date of Patent: Nov. 4, 2003

(54) TAPE DRIVING APPARATUS

(75) Inventors: Takao Hiramoto, Kanagawa (JP);
Yoshihisa Takayama, Kanagawa (JP);
Tatsuya Kato, Kanagawa (JP);
Kazuyuki Hirooka, Kanagawa (JP);
Kenichiro Kikukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/538,876

(22) Filed: Mar. 30, 2000

(30) Foreign Application Priority Data

Mar. 31, 1999 (JP) .......................................... P11-093322

(51) Int. Cl.⁷ .............................................. G11B 19/02
(52) U.S. Cl. ....................................................... 360/69
(58) Field of Search ........................... 360/69, 71, 72.1, 360/72.3

(56) References Cited

U.S. PATENT DOCUMENTS 3,984,814 A * 10/1976 Bailey, Jr. et al. ............. 714/16
6,134,066 A * 10/2000 Takayama et al. ............. 360/60
6,195,007 B1 * 2/2001 Takayama et al. ........ 340/572.1
6,298,408 B1 * 10/2001 Park .............................. 710/129

* cited by examiner

Primary Examiner—David Hudspeth
Assistant Examiner—Mitchell Slavitt
(74) Attorney, Agent, or Firm—Jay H. Maioli

(57) ABSTRACT

A tape driving apparatus which operates corresponding to the individual tape cassette loaded therein. A tape driving unit is included for running a magnetic tape included in the tape cassette and for recording/reproducing information to/from the magnetic tape. A memory driving unit is provided for reading/writing management information from/to a memory by implementing a predetermined communicating process. The memory is located at the tape cassette and stores the management information for managing a recording/reproducing operation to/from the magnetic tape. Identification information of the tape cassette is detected from the memory. A knowledge information memory stores knowledge information formed of operation specifying information and conditional information corresponding to the identification information of the tape cassette. The conditional information is evaluated based on the identification information. A controller controls a predetermined operation corresponding to the operation specifying information based on a result of the evaluation.

15 Claims, 21 Drawing Sheets

FIG.7

| Manufacture Information (FL1) | |
|---|---|
| manufacture part checksum | |
| mic type | |
| mic manufacture date | |
| mic manufacture line name | |
| mic manufacture plant name | |
| mic manufacture name | |
| mic name | |
| cassette manufacture date | |
| cassette manufacture line name | |
| cassette manufacture plant name | |
| cassette manufacture name | |
| cassette name | |
| oem customer name | |
| Physical Tape Characteristic ID | |
| maximum clock frequency | |
| maximum write cycle | |
| mic capacity | |
| write protect top address | |
| write protect count | |
| reserved | |
| Signature 1 | |
| Signature 2 | |
| cartridge serial number | |
| Manufacturer ID | |
| Secondary ID | |
| cartridge serial number checksum | |
| cartridge serial number CRC | |
| reserved | |
| scratch pad memory checksum | |
| scratch pad memory | |
| Mechanism Error Log | |
| Mechanism Counter checksum | |
| Mechanism Counter | |
| Last 11 Read Drive Lists | ~ FL11 |
| Last 11 Write Drive Lists | ~ FL12 |

FIG.8

| Last 11 Read Drive Lists checksum |
|---|
| Drive Serial number 1(Latest) |
| Drive Serial number 2 |
| Drive Serial number 3 |
| Drive Serial number 4 |
| Drive Serial number 5 |
| Drive Serial number 6 |
| Drive Serial number 7 |
| Drive Serial number 8 |
| Drive Serial number 9 |
| Drive Serial number 10 |
| Drive Serial number 11 |
| reserved |

Last 11 Read Drive Lists(FL11)

FIG.9

| Last 11 Write Drive Lists checksum |
|---|
| Drive Serial number 1(Latest) |
| Drive Serial number 2 |
| Drive Serial number 3 |
| Drive Serial number 4 |
| Drive Serial number 5 |
| Drive Serial number 6 |
| Drive Serial number 7 |
| Drive Serial number 8 |
| Drive Serial number 9 |
| Drive Serial number 10 |
| Drive Serial number 11 |
| reserved |

Last 11 Write Drive Lists(FL12)

FIG.11

| Volume Tag(FL3) | Volume Information Checksum |
| --- | --- |
| | Volume Information |
| | Accumulative Partition Information Checksum |
| | Accumulative Partition Information |
| | Volume Note Checksum |
| | Volume Note |
| | Cartridge Serial Number |
| | Manufacturer ID |
| | Secondary ID |
| | Cartridge Serial Number Part Checksum |
| | Reserved |
| | Specific Volume Tag1 |
| | Specific Volume Tag2 |
| | Specific Volume Tag3 — FL31 |
| | Specific Volume Tag4 |
| | Specific Volume Tag5 |
| | Specific Volume Tag6 |
| | Specific Volume Tag7 |
| | Specific Volume Tag8 |
| | Specific Volume Tag9 |
| | Specific Volume Tag10 |
| | Specific Volume Tag11 |
| | Specific Volume Tag12 |
| | Specific Volume Tag13 |

| | | |
|---|---|---|
| FL311 | CHECK SUM OF Volume Tag 3 | 1byte |
| FL312 | CHARACTER STRING DISCRIMINATING MANUFACTURER OF MAGNETIC TAPE | 5bytes |
| | Reserve | 1byte |
| FL313 | LOT NUMBER OF TAPE CASSETTE | 23bytes |
| FL314 | MANUFACTURED OR OBTAINED DATE OF MAGNETIC TAPE | 4bytes |
| | Reserve | 4bits |
| FL315 | IDENTIFIER INDICATING MATERIAL OF BASE FILM OF MAGNETIC TAPE | 4bits |
| FL316 | ELECTRICAL CHARACTERISTICS OF MAGNETIC TAPE (REPRODUCING OUTPUT VALUE OF REFERENCE SIGNAL) | 1byte |

FIG.15

PARTITION INFORMATION

| Previous Groups Written | |
|---|---|
| Total Groups Written | |
| Reserved | |
| Previous Groups Read | |
| Total Groups Read | |
| Reserved | |
| Total Rewritten Frames | |
| Reserved | |
| Total 3rd ECC Count | |
| Access Count | |
| Update Replace Count | |
| Previous Rewritten Frames | |
| Previous 3rd ECC Count | |
| Reserved | |
| Load Count | |
| Reserved | |
| Valid Maximum Absolute Frame Count | |
| Flag Byte (Partition Attribute Flags) — FL41 | Prevent Write |
| | Prevent Read |
| | Prevent Write Retry |
| | Prevent Read Retry |
| | Reserved |
| | Reserved |
| | Reserved |
| | Partition Open Close Flag |
| Maximum Absolute Frame Count | |

FIG.16(a)

| OPERATION SPECIFYING INFORMATION | | CONDITIONAL INFORMATION | | | | |
|---|---|---|---|---|---|---|
| OPERA- TIONAL COMMAND | OPERA- TIONAL VARIABLE | CONDITIONAL VALUE(1) | CONDITIONAL OPERATOR(1) | INFORMATION SPECIFICATION | CONDITIONAL OPERATOR(2) | CONDITIONAL VALUE(2) |

FIG.16(b)

{ INDICATE FREQUENCY IN USE OF CLEANING ROLLER BY RATE REPRESENTED BY VARIABLE (PERCENTAGE) TO STANDARD

| | | | | | | |
|---|---|---|---|---|---|---|
| 200 | | A COMPANY | = | | NOT SPECIFIED | NOT SPECIFIED |
| (21h) | | | (10h) | (3Eh) | | |

NAME OF MANUFACTURER OF MAGNETIC TAPE DETECTED FROM MIC

FIG.16(c)

| | | | | | | |
|---|---|---|---|---|---|---|
| 200 | | T3CB0522 | < | | < | T3CB1150 |
| (21h) | | | (11h) | (40h) | (11h) | |

{ INDICATE FREQUENCY IN USE OF CLEANING ROLLER BY RATE REPRESENTED BY VARIABLE (PERCENTAGE) TO STANDARD

LOT NUMBER OF CARTRIDGE OF TAPE CASSETTE DETECTED FROM MIC

FIG.17

| OPERATIONAL COMMANDS | |
|---|---|
| MNEMONIC | CODE |
| SET THRESHOLD VALUE FOR JUDGING ERROR OF MEDIUM AT VALUE INDICATED BY VARIABLE | 20h |
| SET FREQUENCY IN USE OF CLEANING ROLLER AT RATE REPRESENTED BY VARIABLE TO STANDARD (PERCENTAGE) | 21h |
| SET UPPER LIMIT OF NUMBER OF TIMES OF RETRIES IN WRITING AT NUMERICAL VALUE REPRESENTED BY VARIABLE | 22h |
| SET UPPER LIMIT OF NUMBER OF TIMES OF RETRIES IN READING AT NUMERICAL VALUE REPRESENTED BY VARIABLE | 23h |
| SET WRITING CURRENT VALUE AT NUMERICAL VALUE INDICATED BY VARIABLE | 24h |
| SET EQUALIZER AT NUMERICAL VALUE INDICATED BY VARIABLE | 25h |
| SET TAPE TENSION DURING NORMAL RUNNING AT NUMERICAL VALUE INDICATED BY VARIABLE | 26h |
| SET TIME-OUT OF ROTATION OF DRUM DURING PAUSE AT NUMERICAL VALUE INDICATED BY VARIABLE | 27h |
| SET UPPER LIMIT OF NUMBER OF TIMES OF RETRIES OF RE-CONTACT OF MIC AT VALUE INDICATED BY VARIABLE | 28h |
| SET CAPACITY OF MIC AT NUMERICAL VALUE INDICATED BY VARIABLE | 29h |
| SET CARRIER FREQUENCY OF NON-CONTACT MIC AT VALUE INDICATED BY VARIABLE | 2Ah |
| SET CARRIER POWER OF NON-CONTACT MIC AT VALUE INDICATED BY VARIABLE | 2Bh |
| SET SIGNAL RATE OF NON-CONTACT MIC AT VALUE INDICATED BY VARIABLE | 2Ch |
| SHIFT TO DISCHARGE STANDBY STATE | 2Dh |

FIG.18

| INFORMATION SPECIFICATION | |
|---|---|
| MNEMONIC | CODE |
| FALSE | 00h |
| TRUE | 01h |
| WILD CARD | 02h |
| Manufacturer Part Checksum | 11h |
| MIC Type | 12h |
| MIC Manufactured Date | 13h |
| MIC Manufacture Line Name | 14h |
| MIC Manufacture Plant Name | 15h |
| MIC Manufacturer Name | 16h |
| MIC Name | 17h |
| Cartridge Manufactured Date | 18h |
| Cartridge Manufacturer Line Name | 19h |
| Cartridge Manufacturer Plant Name | 1Ah |
| Cartridge Manufacturer Name | 1Bh |
| Cartridge Name | 1Ch |
| OEM Customer Name | 1Dh |
| Physical Tape Characteristic ID | 1Eh |
| Max Clock Frequency | 1Fh |
| Block Size | 20h |
| MIC Capacity | 21h |
| Write Protect Top Address | 22h |
| Write Protect Count | 23h |
| Cartridge Serial Number | 24h |
| Manufacturer ID | 25h |
| Secondary ID | 26h |
| Cartridge Serial Number Checksum | 27h |
| Volume Info: Initialize Count | 28h |
| Volume Info: Tape Length and Thickness code | 29h |
| Volume Info:Flags | 2Ah |
| Volume Info: Last Partition Number | 2Bh |

| INFORMATION SPECIFICATION | |
|---|---|
| MNEMONIC | CODE |
| Accumulative Partition Info: Previous Group Written | 2Ch |
| Accumulative Partition Info: Total Group Written | 2Dh |
| Accumulative Partition Info: Previous Group Read | 2Eh |
| Accumulative Partition Info: Total Groups Read | 2Fh |
| Accumulative Partition Info: Total Rewritten Frames | 30h |
| Accumulative Partition Info: Total 3rd ECC Count | 31h |
| Accumulative Partition Info: Access Count | 32h |
| Accumulative Partition Info: Update Replace Count | 33h |
| Accumulative Partition Info: Previous Rewritten Frames | 34h |
| Accumulative Partition Info: Previous 3rd ECC Count | 35h |
| Accumulative Partition Info: Load Count | 36h |
| Accumulative Partition Info: Valid Maximum Absolute Frame Count | 37h |
| Accumulative Partition Info: Partition Open Close Flag | 38h |
| Accumulative Partition Info: Prevent Read Retry | 39h |
| Accumulative Partition Info: Prevent Write Retry | 3Ah |
| Accumulative Partition Info: Prevent Read | 3Bh |
| Accumulative Partition Info: Prevent Write | 3Ch |
| Accumulative Partition Info: Maximum Absolute Frame Count | 3Dh |
| NAME OF MANUFACTURER OF TAPE MEDIUM | 3Eh ~L1 |
| ELECTRICAL CHARACTERISTIC VALUE OF TAPE MEDIUM | 3Fh ~L2 |
| LOT NUMBER OF CARTRIDGE | 40h ~L3 |
| Volume Tag 1 | 41h |
| Volume Tag 2 | 42h |
| Volume Tag 3 | 43h |
| ⋮ | |
| Volume Tag 12 | 4Ch |
| Volume Tag 13 | 4Dh |
| Volume Tag 14 | 4Eh |

FIG.19

| CONDITIONAL OPERATOR ||
|:---:|:---:|
| MNEMONIC | CODE |
| NOP | 00h |
| = | 10h |
| < | 11h |
| > | 12h |
| ≤ | 13h |
| ≥ | 14h |
| + | 15h |
| − | 16h |
| × | 17h |
| ÷ | 18h |

FIG.20

(a) TYPE Record = KNOWLEDGE UNIT
   Begin
   OPERATIONAL COMMAND : unsigned integer ;
   OPERATIONAL VARIABLE : unsigned integer ;
   INFORMATION SPECIFICATION : unsigned integer ;
   CONDITIONAL OPERATOR (1) : Byte ;
   CONDITIONAL OPERATOR (2) : Byte ;
   CONDITIONAL VALUE (1) LENGTH : Byte ;
   CONDITIONAL VALUE (2) LENGTH : Byte ;
   CONDITIONAL VALUE (1) : array [1..CONDITIONAL VALUE (1) LENGTH] of Byte ;
   CONDITIONAL VALUE (2) : array [1..CONDITIONAL VALUE (2) LENGTH] of Byte ;
   End ;

(b) TYPE Record =: WHOLE KNOWLEDGE
   Begin
   TOTAL NUMBER OF KNOWLEDGE
   LENGTH OF EACH KNOWLEDGE : array [1..TOTAL NUMBER OF KNOWLEDGE] of byte ;
   KNOWLEDGE UNIT : array [1..TOTAL NUMBER OF KNOWLEDGE] of knowledge ;
   End ;

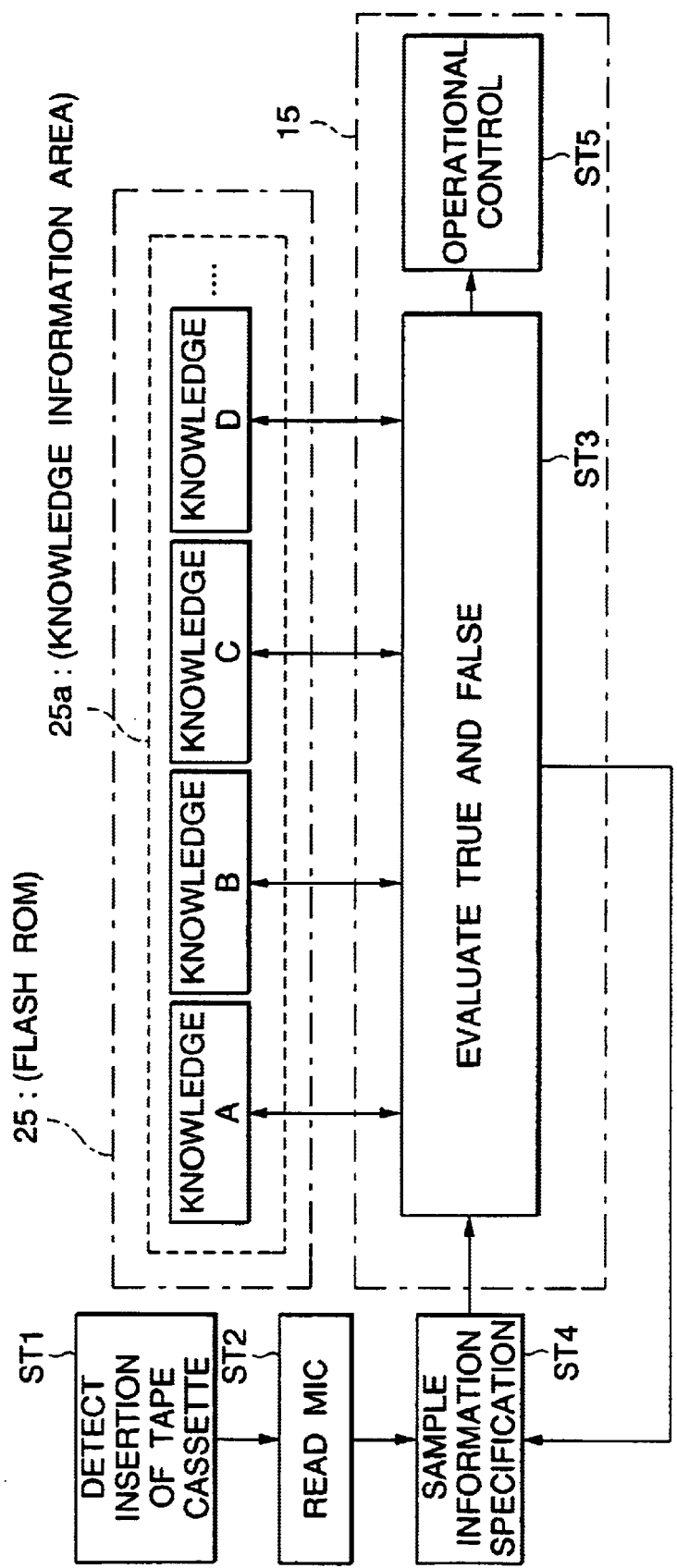

TAPE DRIVING APPARATUS

FIELD OF THE INVENTION

The present invention relates to a tape driving apparatus which operates corresponding to a loaded tape cassette.

BACKGROUND OF THE INVENTION

A so-called tape streaming drive has been known as a driving apparatus which is capable of recording/reproducing digital data to/from a magnetic tape. Such tape streaming drive is capable of having an enormous amount of recording capacity of several tens to several hundreds of gigabytes, for example, though it depends on the length of the tape in a tape cassette or the storage medium. Therefore, such a tape streaming drive is widely used for backing up data recorded in a medium such as a hard disk of a computer main body. It is also considered to be suitable for use in storing image data or the like of large data size.

The tape cassette is a so-called removable medium which can be discharged out of the tape streaming drive. Accordingly, data recorded in the same tape cassette may be reproduced by another tape streaming drive or data may be recorded thereto by a different tape streaming drive.

Holes called "index holes" are provided at certain positions of a case of the tape cassette, so as to be able to identify the type of the tape cassette. In this way, the tape streaming drive can detect the format type, tape length, tape thickness, type of magnetic substance, and the like of the loaded tape cassette.

The number of index holes is limited, however, due to a problem such as the space where the index holes can be created, and the index holes cannot indicate more detailed information such as the electrical characteristics and the manufacture date of the tape cassette, for example. Accordingly, it is difficult for the tape streaming drive to discriminate different individual tape cassettes caused by the difference of the manufacturing date and the manufacturer. That is, there has been a problem that the tape streaming drive can implement only operational controls set in advance for all tape cassettes to be loaded.

SUMMARY OF THE INVENTION

In order to solve such a problem, according to the present invention, a tape driving apparatus comprises tape driving means for running a magnetic tape when a tape cassette storing the magnetic tape is loaded and for recording/reproducing information to/from the magnetic tape; memory driving means for reading/writing management information from/to a memory by implementing a certain communicating process when the tape cassette is provided with the memory for recording management information for managing the recording/reproducing operation to/from the magnetic tape; identification information detecting means for detecting identification information of the tape cassette from the memory; knowledge information storage means for storing knowledge information composed of operation specifying information and conditional information corresponding to the identification information of the tape cassette; evaluating means for evaluating the conditional information based on the identification information; and control means for controlling the certain operation corresponding to the operation specifying information based on the result of evaluation of the evaluating means.

According to the present invention, the tape driving apparatus is configured so as to execute a certain operation by evaluating the knowledge information based on the identification information of the tape cassette detected from the memory means of the loaded tape cassette. That is, it becomes possible to realize the operation corresponding individually to the loaded tape cassette.

BRIEF DESCRIPTION OF THE DRAWINGS

FIG. 7 is a table for explaining Manufacture Information of the MIC of the embodiment of the present invention.

FIG. 8 is a table for explaining a Last 11 Read Drive List of the embodiment of the present invention.

FIG. 9 is a table for explaining a Last 11 Write Drive List of the embodiment of the present invention.

FIG. 11 is a table for explaining Volume Tags of the MIC of the embodiment of the present invention.

FIG. 12 is a table for explaining a specific Volume Tag of the embodiment of the present invention.

FIG. 15 is a table for explaining Partition Information of the MIC of the embodiment of the present invention.

FIG. 16 is a table for explaining a structure of knowledge information.

FIG. 17 is a table for explaining operational commands of operation specifying information.

FIG. 18 is a table for explaining an information specification.

FIG. 19 is a table for explaining a conditional operator.

FIG. 20 is a table for explaining the data structure of a knowledge unit and of a whole knowledge.

FIG. 21 is a block diagram of a system for evaluating knowledge corresponding to the loaded tape cassette.

DETAILED DESCRIPTION OF PREFERRED EMBODIMENTS

Although the present applicant has previously proposed various tape cassettes fitted with a nonvolatile memory and tape streaming drives that are capable of recording/reproducing digital data in correspondence to the memory-fitted tape cassette, the present invention will be applied to the data storage system comprising the memory-fitted tape cassette and the tape streaming drive in the present embodiment.

The explanation will be given below in the following order:
1. Structure of the Tape Cassette;
2. Structure of the Remote Memory Chip;
3. Structure of the Tape Streaming Drive;
4. Data Structure of the MIC;
5. Knowledge Information 1. Structure of the Tape Cassette:

At first, the tape cassette for use with the tape streaming drive of the present embodiment will be explained with reference to FIGS. 3(a), 3(b), and 4.

Figure 3A:
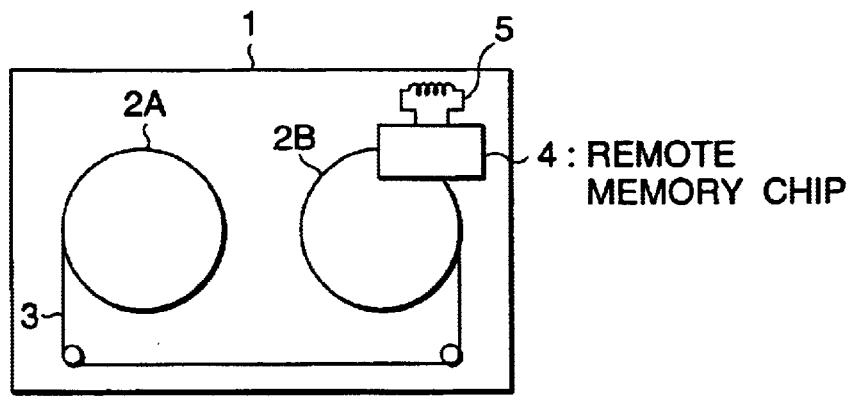
FIGS. 3(*a*) and 3(*b*) are explanatory diagrams schematically showing the internal structure of a tape cassette according to two embodiments of the present invention.

FIG. 3(a) conceptually shows the internal structure of the tape cassette in which the remote memory chip is disposed. Reels 2A and 2B are provided and a magnetic tape 3 of 8 mm in tape width is wound between the reels 2A and 2B.

The tape cassette 1 is provided with a remote memory chip 4 containing a non-volatile memory, a control, circuit system, and other components. The remote memory chip 4 is constructed so as to be able to transmit data with a remote memory interface 30 by radio communication and is provided with an antenna 5 for that end.

The remote memory chip 4 stores manufacturing information, serial No. information, the thickness, length and material of the tape, information related to history of use of recorded data per partition, user information, and other information relating to the tape cassette.

It is noted that various information stored in the remote memory chip 4 is mainly used to manage various recording/reproducing operations to/from the magnetic tape 3 in the present embodiment, so that they will be referred to as "management information" in general.

The tape streaming drive, provided with the nonvolatile memory within the tape cassette, stores management information in the nonvolatile memory, and the tape cassette is provided with an interface for writing/reading data to/from the nonvolatile memory. The recording/reproducing operation to/from the magnetic tape 3 may be efficiently carried out by reading/writing management information related to the operation for recording/reproducing data to/from the magnetic tape 3 in the nonvolatile memory.

For instance, it is not necessary to rewind the magnetic tape to the tape beginning in loading/unloading the tape, that is, the magnetic tape may be loaded/unloaded even in the middle of the tape. Data may be also edited by rewriting the management information on the nonvolatile memory. Furthermore, it becomes easy to set a large number of partitions on the tape and to adequately control such partitions.

Figure 3B:
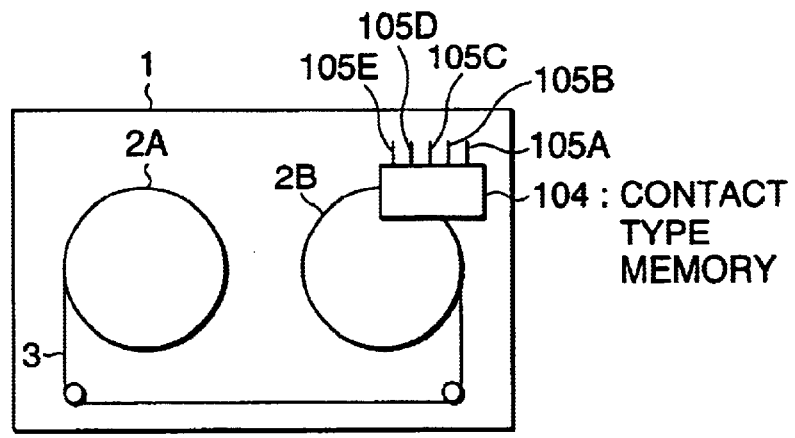

FIG. 3(b) shows the tape cassette 1 in which a contact-type memory 104 (a nonvolatile memory) is contained. In this case, five terminals 105A, 105B, 105C, 105D, and 105E are led out as a power terminal, a data input terminal, a clock input terminal, an earth terminal, and a spare terminal, respectively, from the module of the contact type memory 104. Management information similar to that of the remote memory chip 4 is stored as data within the contact type memory 104. It is noted that the remote memory chip 4 and the contact type memory 104 will be referred to as MIC (Memory In Cassette) when they are referred in the explanation below.

Figure 4:
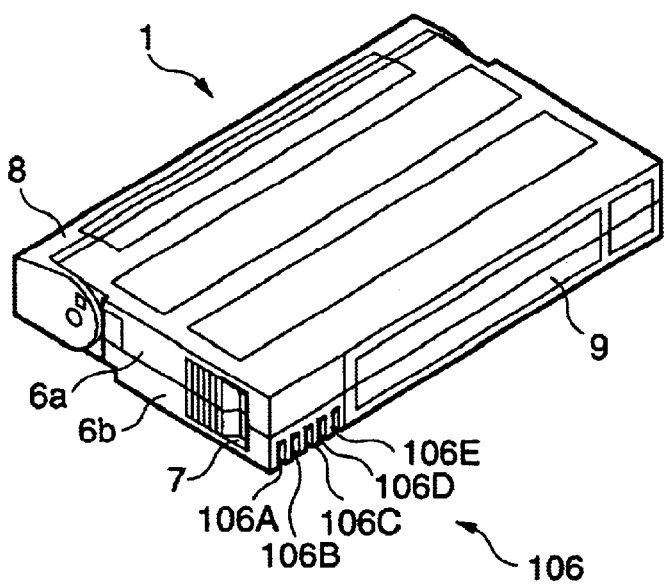
FIG. 4 is a perspective view showing the appearance of the tape cassette of an embodiment of the present invention.

FIG. 4 shows an exemplary appearance of the tape cassette 1 in FIG. 3(a) or 3(b). The whole case is composed of an upper case 6a, a lower case 6b and a guard panel or lid 8 and is constructed basically in the same manner as a tape cassette used for conventional 8 mm VTRs.

The tape cassette 1 is provided with a terminal section 106 in the vicinity of a label face 9 at the side of the tape cassette 1. This is the region where electrode terminals are disposed in the tape cassette of the type containing the contact type memory 104 in FIG. 3(b) and this region is provided with terminal pins 106A, 106B, 106C, 106D and 106E. These terminal pins are connected respectively with the terminals 105A, 105B, 105C, 105D and 105E shown in FIG. 3(b). That is, the tape cassette 1 having the contact type memory 104 physically contacts the tape streaming drive via the terminal pins 106A, 106B, 106C, 106D and 106E to mutually transmit data signals and the like.

Meanwhile, the terminal pins are not necessary in the type containing a non-contact type remote memory chip 4 as shown in FIG. 3(a), however, its appearance turns out as shown in FIG. 4 and the dummy terminal section 106 is provided to keep the compatibility of the shape of the tape cassette with the apparatus.

Further, although not shown, a non-contact type remote memory chip formed into the shape of a label has been also known. The label in which the remote memory chip is formed is pasted at certain position of the case of the tape cassette 1. Thereby, the remote memory chip can communicate with memory drive means of the tape streaming drive when the tape cassette 1 is loaded to the tape streaming drive 10.

Figure 5:
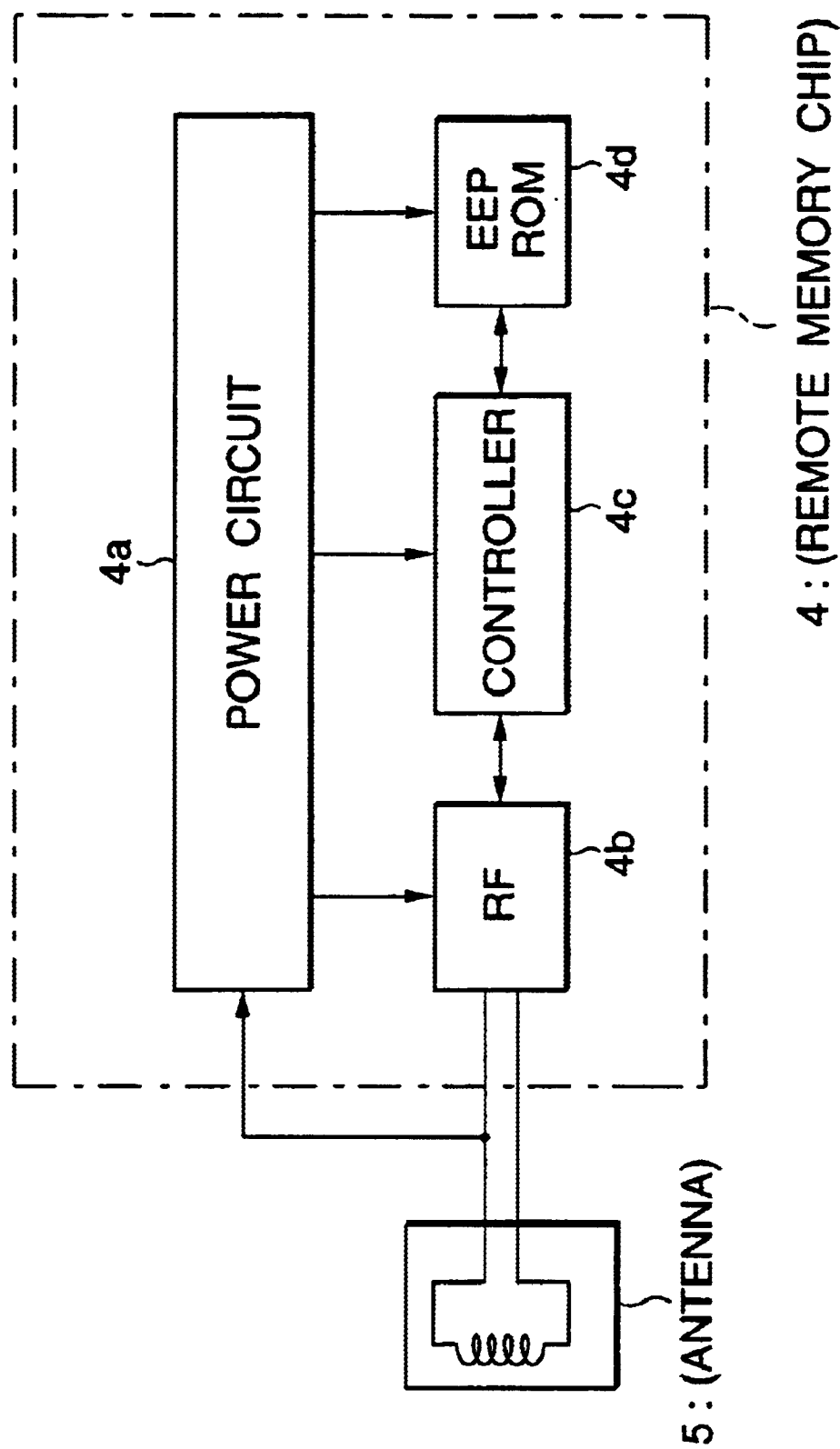
FIG. 5 is a block diagram of a remote memory chip provided in the tape cassette of the embodiment of the present invention.

2. Structure of the Remote Memory Chip:

FIG. 5 shows the internal structure of the remote memory chip 4. The remote memory chip 4 comprises a power circuit 4a, an RF processing section 4b, a controller 4c, and an EEPROM 4d as shown in FIG. 5 as a semiconductor integrated circuit IC. Such remote memory chip 4 is mounted on a printed board fixed within the tape cassette 1, and an antenna 5 is formed by the copper foil formed on the printed board.

The remote memory chip 4 is constructed so as to receive power from the outside without physical contact. While carrier waves of a 13 MHZ band are used, for example, for the communication with the tape streaming drive 10 described later, the power circuit 4a converts the carrier waves of the 13 MHZ band into DC power by receiving radio waves from the tape streaming drive 10 via the antenna 5. Then, the DC power is supplied to the RF processing section 4b, the controller 4c, and the EEPROM 4d as the operational power source.

The RF processing section 4b demodulates received information and modulates information to be transmitted.

The controller 4c executes and controls processes corresponding to decoding and to decoded information (commands) of the signal received from the RF processing section 4b, e.g., processes for writing/reading to/from the EEPROM 4d.

That is, the remote memory chip 4 is put into the power-on state by receiving the radio waves from the tape streaming drive 10 and the controller 4c executes a process specified by a command superimposed on the carrier waves and manages data of the RF processing section 4b, that is the nonvolatile memory.

3. Structure of the Tape Streaming Drive:

Next, the structure of the tape streaming drive 10 using the tape cassette 1 mounting the remote memory chip 4 shown in FIG. 3(a) will be explained with reference to FIG. 1. The tape streaming drive 10 records/reproduces data to/from the magnetic tape 3 in the tape cassette 1 in a helical scan scheme.

Figure 1:
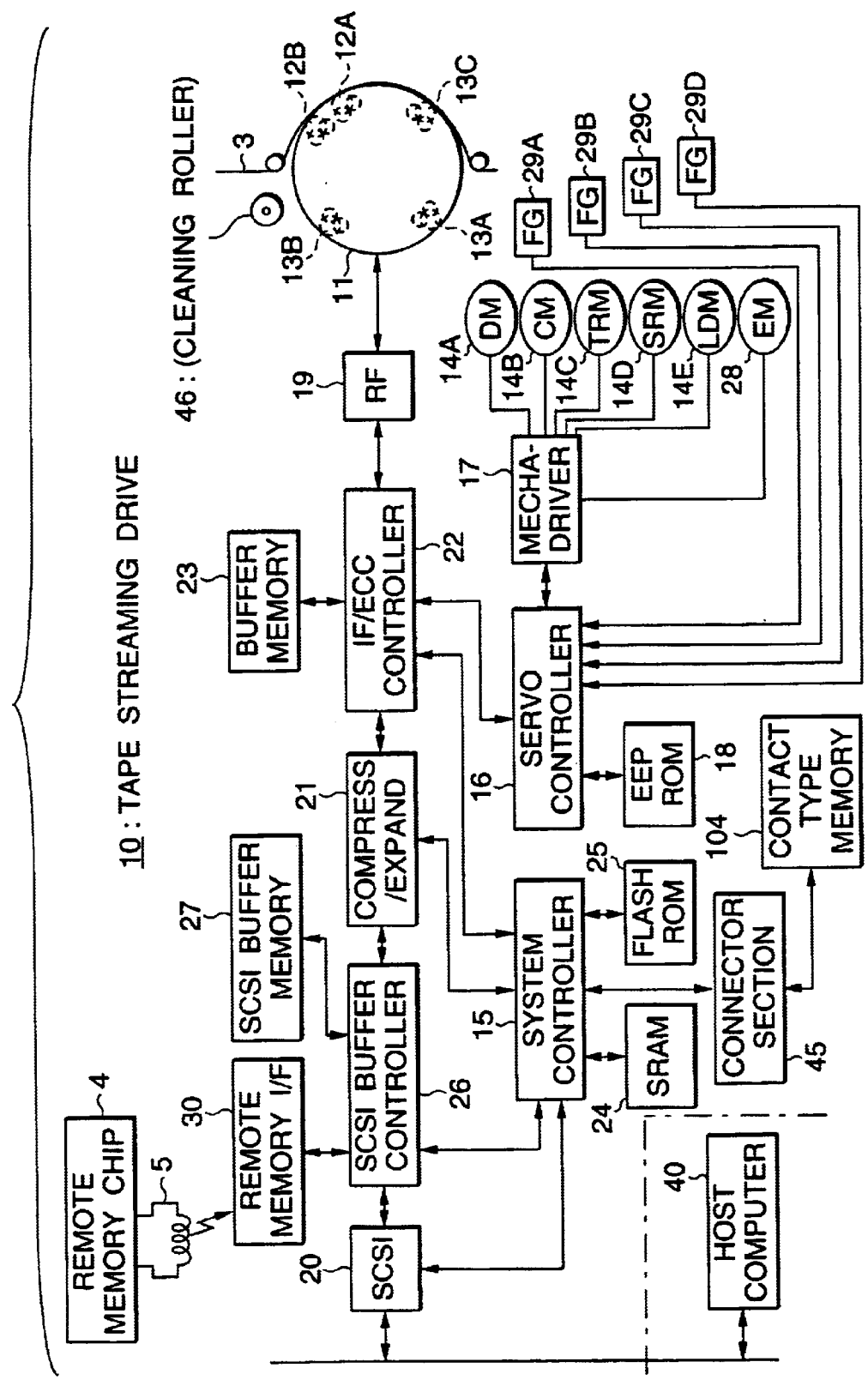
FIG. 1 is a block diagram of a tape streaming drive accommodating a remote memory chip according to an embodiment of the present invention.

In FIG. 1, a rotary drum 11 is provided with two recording heads 12A and 12B and three reproducing heads 13A, 13B, and 13C, for example. The recording heads 12A and 12B are disposed so that two gaps having different azimuth angles are very close to each other. The reproducing heads 13A, 13B, and 13C also have respective predetermined azimuth angles.

A drum motor 14A rotates the rotary drum 11 around which the magnetic tape 3 pulled out of the tape cassette 1 is wound. The magnetic tape 3 is fed by a capstan motor 14B and a pinch roller (not shown). While the magnetic tape 3 is wound around the reels 2A and 2B as described above, and the reels 2A and 2b are rotated by reel motors 14C and 14D in the forward and reverse directions, respectively.

A loading motor 14E drives a loading mechanism (not shown) to load/unload the magnetic tape 3 to/from the rotary drum 11.

An ejecting motor 28 is a motor for driving the loading mechanism of the tape cassette 1 and executes operations for seating the inserted tape cassette 1 and for ejecting the tape cassette 1.

A cleaning roller 46 arranged in the vicinity of the rotary drum 11 is abutted to the rotary drum 11 based on a driving signal supplied from a mecha-driver 17 via a route not shown. Thereby, contamination adhered to the recording heads 12A and 12B and the reproducing heads 13A, 13B, and 13C may be removed by driving the magnetic tape 3.

While the frequency of use of the cleaning roller 46 is set in advance by a firmware, the frequency of use may be set for each tape cassette as described herein below.

The mecha-driver 17 applies power and drives the drum motor 14A, the capstan motor 14B, the reel motors 14C and 14D, the loading motor 14E, and the ejecting motor 28. The mecha-driver 17 drives the respective motors based on control signals from a servo controller 16. The servo controller 16 controls the rotating speed of the respective motors to execute various operations such as the running of the tape in recording/reproducing data normally, in quickly reproducing data, and in quickly feeding and rewinding the tape.

It is noted that an EEPROM 8 stores constants and the like used by the servo controller 16 for servo-controlling the respective motors.

The drum motor 14A, the capstan motor 14B, the T reel motor 14C and the S real motor 14D are provided with respective frequency generators (FGs) to be able to detect information on the rotation of the respective motors in order to enable the servo controller 16 to execute the servo control of the respective motors. That is, a drum FG 29A for generating frequency pulses synchronized with the rotation of the drum motor 14A, a capstan FG 29B for generating frequency pulses synchronized with the rotation of the capstan motor 14B, a T-reel FG 29C for generating frequency pulses synchronized with the rotation of the T-reel motor 14C and an S-reel FG 29D for generating frequency pulses synchronized with the rotation of the S-reel motor 14D are formed and their outputs (FG pulses) are supplied to the servo controller 16.

Discriminating the rotating speed of the respective motors based on those FG pulses, the servo controller 16 detects any error from the intended rotating speed for each motor and controls the mecha-driver 17 regarding the applied power corresponding to that error, thus realizing control of the rotating speed by a closed loop. Accordingly, the servo controller 16 can control the respective motors so that they rotate at target rotating speeds corresponding to the respective operations during the various operations, such as the normal run in recording/reproducing data, high-speed search, quick-feed, rewind and others.

The servo controller 16 is bi-directionally connected with a system controller 15 for executing control processes of the whole system via an interface controller/ECC formatter 22, hereinafter referred to as an IF/ECC controller.

In the tape streaming drive 10, an SCSI interface 20 is used for inputting/outputting data. For instance, data is inputted sequentially from a host computer 40 via the SCSI interface 20 in units of transmission data of fixed length record and is supplied to a compressing/expanding circuit 21 via an SCSI buffer controller 26. The SCSI buffer controller 26 is arranged so as to control data transferred by the SCSI interface 20. An SCSI buffer memory 27 is buffer means provided corresponding to the SCSI buffer controller 26 to obtain transfer speed of the SCSI interface 20. The SCSI buffer controller 26 also supplies certain command data to a remote memory interface 30 described later and generates operational clock pulses for the remote memory interface 30.

It is noted that there also exists a mode of transmitting data from the host computer 40 in unit of sets of variable length data in such tape streaming drive system.

The compressing/expanding circuit 21 implements a process for compressing the inputted data in a predetermined method as necessary. When a compressing method by means of LZ codes, first expounded by J. Ziv and A. Lempel, is adopted as one example of the compressing methods, dedicated codes are allocated to character strings processed in the past and are stored in a shape of a dictionary. Then, a character string inputted thereafter is compared with the contents of the dictionary and when it coincides with the code in the dictionary, the data of the character string is replaced with the code in the dictionary. When the data of the inputted character string does not coincide with the code in the dictionary, a new code is given thereto and is registered in the dictionary one after another. Thus, the data compression is carried out by registering data of inputted character strings and by replacing the character string data with the codes of the dictionary.

While the output of the compressing/expanding circuit 21 is supplied to the IF/ECC controller 22, the IF/ECC controller 22 stores the output of the compressing/expanding circuit 21 in a buffer memory 23. The data stored in the buffer memory 23 is processed to be handled in units of fixed length corresponding to 40 tracks of the magnetic tape and is processed into an ECC format under the control of the IF/ECC controller 22.

As the ECC formatting process, an error correcting code is added to the recorded data and the data is modulated to be compatible with the magnetic recording. The data is then supplied to an RF processing section 19. The RF processing section 19 implements processes such as amplification and record equalizing to the recorded data to generate a recording signal to be supplied to the recording heads 12A and 12B, and the data is recorded on the magnetic tape 3.

The data reproducing operation will be explained briefly. The reproducing heads 13A and 13B read the data recorded in the magnetic tape 3 as RF reproducing signals and the RF processing section 19 implements reproduction equalizing, generation of reproducing clocks, binarization, decoding, for example, Viterbi decoding, and others on the reproduced output.

The signal thus read is supplied to the IF/ECC controller 22 to undergo an error correcting process and other processes and it is then stored temporarily in the buffer memory 23 and is read at a predetermined time to be supplied to the compressing/expanding circuit 21.

Based on the judgment of the system controller 15, the compressing/expanding circuit 21 implements a data expanding process when the data has been compressed by the compressing/expanding circuit 21 during recording or outputs the data as it is without implementing the data expanding process when the data is non-compressed data.

The output data of the compressing/expanding circuit 21 is outputted to the host computer 40 as reproduced data via the SCSI buffer controller 26 and the SCSI interface 20.

FIG. 1 also shows the remote memory chip 4 within the tape cassette 1. When the main body of the tape cassette is loaded to the tape streaming drive, the remote memory chip 4 is enabled to input/output data to/from the system controller 15 via the remote memory interface 30 without physical contact.

Figure 2:
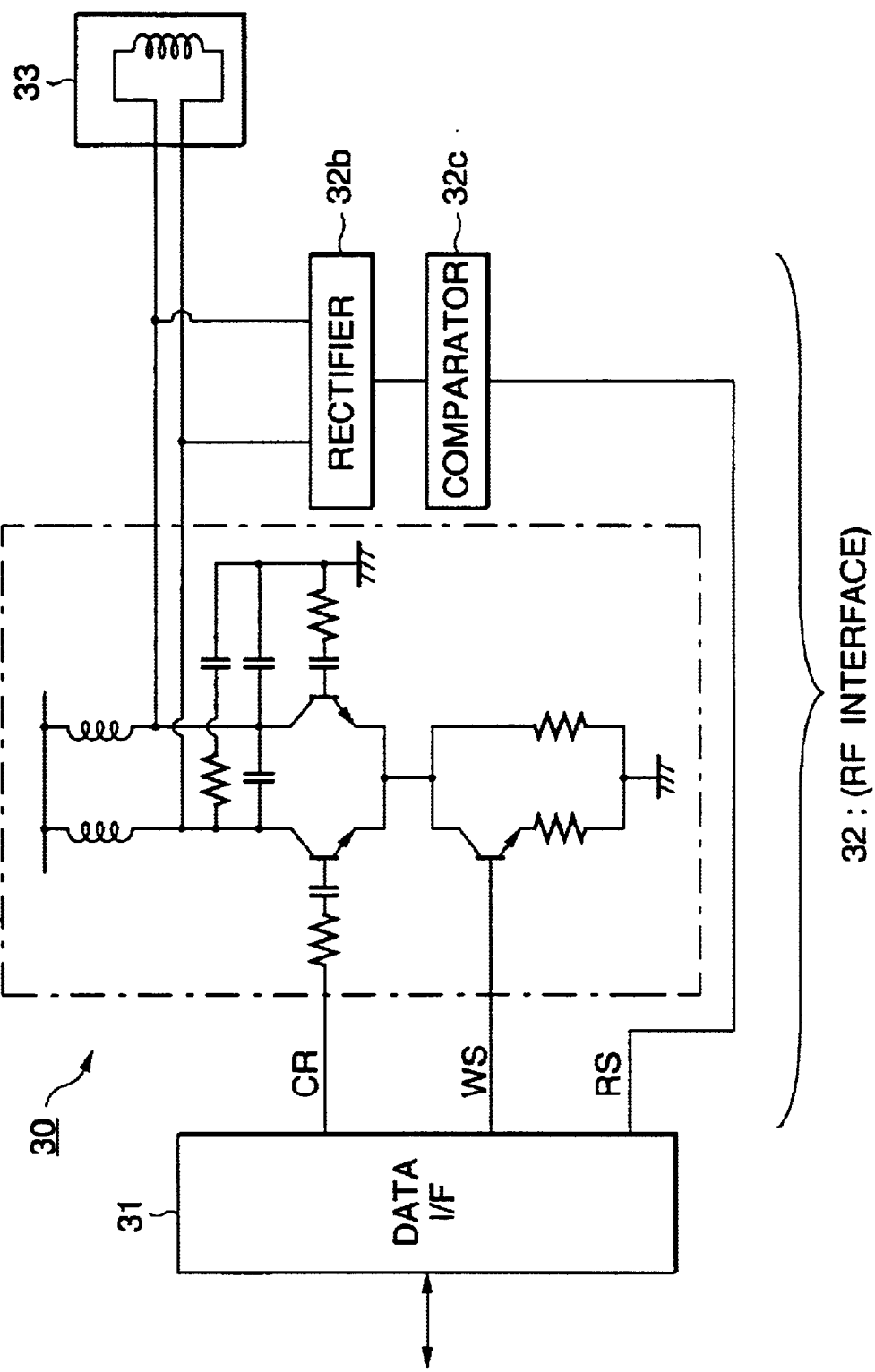
FIG. 2 is a block diagram of a remote memory interface disposed in the tape streaming drive according to the embodiment of the present invention.

FIG. 2 shows the structure of the remote memory interface 30, in which data interface 31 exchanges data with the system controller 15. While data is transferred to the remote memory chip 4 in a mode of a command from the apparatus side and an acknowledgment from the remote memory chip 4 corresponding to that is issued as described later, the data interface 31 receives command data and a clock signal from the SCSI buffer controller 26 when the system controller 15 issues a command to the remote memory chip 4. Then, based on the clock signal, the data interface 31 supplies the command data to an RF interface 32. The data interface 31 also supplies carrier frequency CR (13 MHZ) to the RF interface 32.

The RF interface 32 is provided with an RF modulating/amplifying circuit 32a for amplitude-modulating (100 KHz) and superimposing a command WS to the carrier frequency CR and for applying the modulated signal to an antenna 33.

The command data is transmitted by radio waves from the antenna 33 to the antenna 5 within the tape cassette 1 by this RF modulating/amplifying circuit 32a. Receiving the command data via the antenna 5, the tape cassette 1 is put into the power-on state by the structure explained in FIG. 5, and the controller 4c becomes operative corresponding to the contents specified by the command. For instance, it writes data transmitted together with a write command into the EEPROM 4d.

When the remote memory interface 30 issues a command, the remote memory chip 4 issues an acknowledgment corresponding to that command. That is, the controller 4c of the remote memory chip 4 causes the RF processing section 4b to modulate and amplify the data and issues an acknowledgment that is transmitted by the antenna 5.

When such acknowledgment is transmitted and received by the antenna 33, the receiving signal is rectified by a rectifier circuit 32b of the RF interface 32 and is then demodulated as data RS by a comparator 32c. It is then supplied from the data interface 31 to the system controller 15. For instance, when the system controller 15 issues a read command to the remote memory chip 4, the remote memory chip 4 transmits data read from the EEPROM 4d together with the code as an acknowledgment corresponding to that. Then, the acknowledgment code and the read data are received and demodulated by the remote memory interface 30 to be supplied to the system controller 15.

As described above, the tape streaming drive 10 can access the remote memory chip 4 within the tape cassette 1 with the remote memory interface 30.

It is noted that although data is superimposed to the carrier of a 13 MHZ band with an amplitude modulation of 100 KHz, the original data is packeted data in such non-contact data exchange. That is, a header, a parity and other necessary information are added to the data as a command and acknowledge to packet the data, and the code of the packet is converted so as to be transmitted/received as a stable RF signal.

It is noted that the technology for realizing such non-contact interface has been introduced as a technology applied before by the present applicant and registered as Japanese Patent No. 2550931.

An S-RAM 24 and a flash ROM 25 shown in FIG. 1 store data used by the system controller 15 for the various processes. For instance, the flash ROM 25 stores constants used for the control. The S-RAM 24 is used as a work memory, as a memory for storing data read/written from/to the MIC, mode data set in a unit of the tape cassette, and various flag data, or as a memory used for arithmetic processes.

Further, the flash ROM 25 stores various information such as the frequency of use of the cleaning roller, a number of data writing/reading retries, a writing current value in the RF processing section 19, and equalizer characteristics and the like as firmware. When the tape cassette is loaded, control is made based on this firmware in the tape streaming drive 10.

In the present invention, "knowledge information" is recorded to control operations corresponding to the tape cassette 1 loaded to the tape streaming drive 10. While the firmware is operational information set in the tape streaming drive 10 itself and used in general for all of the loaded tape cassettes, the "knowledge information" is information for executing a certain operation when the loaded tape cassette 1 is determined to satisfy a certain condition. That is, the tape streaming drive 10 can control operations corresponding to each individual tape cassette 1 by evaluating the identification information of the tape cassette stored in the MIC in correspondence with the "knowledge information." Thereby, when the tape cassette 1 storing the magnetic tape 3 manufactured by "A Company," for instance is loaded, the frequency of use of the cleaning roller may be increased/lowered. It is noted that the structure and other of the "knowledge information" will be explained later in detail.

As example of the frequency of use of the cleaning roller, when a tape cassette that has been found to be defective is loaded, the recording heads 12A and 12B and the reproducing heads 13A, 13B, and 13C may be kept in good condition by being cleaned relatively often by having knowledge information for increasing the frequency in use. When a tape cassette in which the state of the magnetic tape is found to be very good, is loaded, the life of the cleaning roller and each head may be prolonged by setting the frequency of use low.

It is noted that the S-RAM 24 and the flash ROM 25 may be constructed as an internal memory of a microcomputer composing the system controller 15 to function as or part of an area of the buffer memory 23 may be used as a work memory.

While information is transmitted mutually between the tape streaming drive 10 and the host computer 40 by using the SCSI interface 20 as described above, the host computer 40 makes various communications with the system controller 15 by using the SCSI commands.

For use with the structure corresponding to the tape cassette carrying the contact type memory 104 shown in FIG. 3(b), there is provided a connector section 45 for writing/reading data to/from the contact type memory 104 within the tape cassette 1. This connector has a shape fitted to the terminal section 106 shown in FIG. 4 and electrically connects five terminals 105A, 105B, 105C, 105D, and 105E of the contact type memory 104 with the system controller 15 to function as ports for connecting the memory of the system controller.

In this manner, the system controller 15 is permitted to access the contact type memory 104 of the loaded tape cassette 1 through the connector section 45 and the terminal section 106.

When the connection between the connector section 45 and the terminal section 106 is not good, the seating state of the tape cassette 1 is shifted more or less to readjust the contact physically by driving a loading mechanism by the loading motor 14E.

Figure 6:
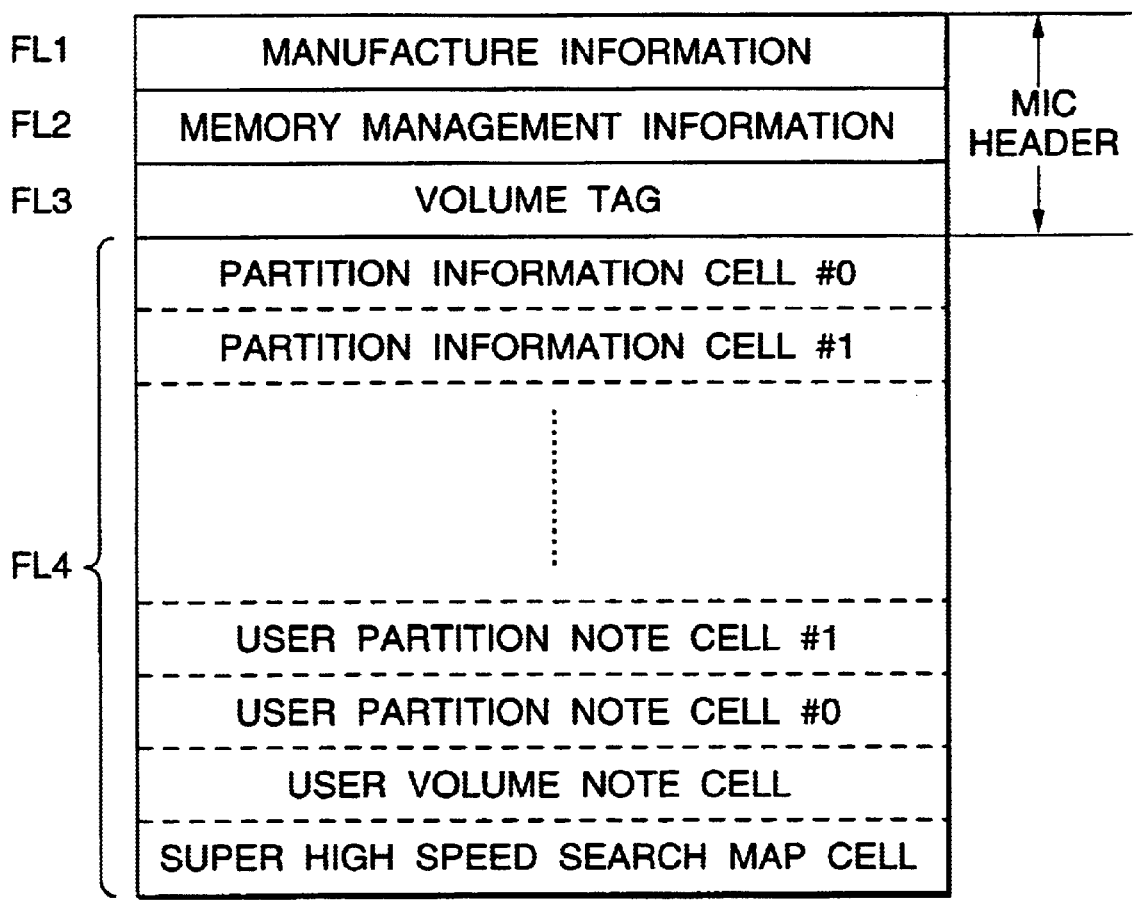
FIG. 6 is a table for explaining the data structure of a memory in cassette or MIC of the embodiment of the present invention.

4. Data Structure of the MIC:

Next, the data structure of the MIC either the remote memory chip 4 or the contact type memory 104, provided in the tape cassette 1 will be explained. FIG. 6 is a schematic diagram showing one example of the structure of data stored in the MIC. Fields FL1 through FL4 are set as shown in FIG. 6 as storage areas of the MIC. Various information in manufacturing the tape cassette, tape information at the time of initialization, and information per partition are written to these Fields FL1 through FL4.

Manufacture Information is stored in Field FL1. That is, it is a manufacture part in which various information concerning manufacturing the tape cassette is mainly stored.

Memory Management Information is stored in Field FL2. That is, it is a Drive Initialize Part in which information at the time of initialization is mainly stored.

Volume Tag is stored in Field FL3. That is, fundamental management information of the whole tape cassette is stored therein.

Field FL4 is a memory free pool area where management information may be stored additionally. The history of recording/reproducing operations and various information are stored as necessary in this memory free pool. It is noted that one unit of data group stored in the memory free pool will be called as a "cell" hereinafter. At first, Partition Information Cells #0, #1, . . . which are management information corresponding to each partition are written one after another from the head of the memory free pool corresponding to Partitions formed on the magnetic tape 3. That is, Partition Information Cells are formed as the same number of cells with the Partitions formed on the magnetic tape 3. Super High Speed Search Map Cell as map information for high speed search is written from the rear end side of the memory free pool.

Prior to that, User Volume Note Cell and User Partition Note Cell are written from the rear end side. User Volume Note Cell is information such as a comment inputted by the user concerning the whole tape cassette and User Partition Note Cell is information such as a comment inputted by the user concerning each partition. Accordingly, these are stored when the user instructs to write, and all of these are not necessarily described.

Intermediate areas in which no such information is stored are left as they are as the memory free pool to be written into later.

Manufacture Information in Field FL1 has the structure as shown in FIG. 7, in which checksum information on the data of the manufacture information is stored as manufacture part checksum at the head. The information of this manufacture part checksum is given in manufacturing the cassette.

Then, information from MIC type to Write Protect Byte Count is described as actual data composing the manufacture part. It is noted that Reserved indicates an area reserved for storing data in the future.

MIC type is data indicating the type of MIC actually provided in the tape cassette concerned. MIC manufacture date indicates the date and time when the MIC concerned was manufactured. MIC manufacture line name indicates information on the name of a line on which the MIC was manufactured. MIC manufacture plant name indicates information on the name of a factory in which the MIC was manufactured. MIC manufacturer name indicates information on the name of the manufacturer of the MIC. MIC name indicates information on the vendor of the MIC.

Cassette manufacture date, cassette manufacture line name, cassette manufacture plant name, cassette manufacturer name, and cassette name describe information on the cassette itself similarly to the information on the MIC described above.

It is noted that for data concerning the dates, such as MIC manufacture date and cassette manufacture date, the mode of date "DD", month "MM" and year "YY" indicating the date, month and year by two digits is adopted.

Information on the name of a customer company of OEM is stored in OEM (Original Equipment Manufacture) customer name. Physical tape characteristic ID indicates information on the physical characteristics of the magnetic tape 3 such as the material, thickness and length of the tape, for example. Information indicating the maximum clock frequency accommodated by the MIC is stored in maximum clock frequency. Block size represents information, for example, on how many bytes of data may be transferred by one time of communication with the tape streaming drive 10 as the characteristic of the MIC. This information depends on the physical characteristics of a nonvolatile memory used as the MIC. MIC capacity indicates information on a storage capacity of the MIC concerned. Write protect top address is used to prohibit to write into a certain partial area of the MIC indicating the starting address of a write protected area. Write protect count indicates a number of bytes of the write protected area. That is, an area from the address specified by the write protect top address to the area occupied by the number of bytes indicated by the area of the write protect count is set as the write protected area. Signature 1 and Signature 2 indicate information on copyrights. Cartridge Serial Number, Manufacturer ID, Secondary ID, Cartridge Serial Number Part Checksum, Cartridge Serial Number CRC, scratch pad memory checksum and scratch pad memory are information for authentication in retrieving a desired tape cassette 1 by a certain mechanism when the tape cassette 1 is used in a library apparatus comprising a plurality of tape streaming drives 10 and others. Mechanism Error Log stores certain error codes corresponding to mechanical errors or the like occurring in the tape streaming drive 10 following Mechanism Error Log Checksum. That is, it is possible to determine the type of the error by making reference to this error code. Following the Mechanism Error Log, Mechanism Counter Checksum and Mechanism Counter are stored. This Mechanism Counter stores information such as a number of seated times when the tape cassette 1 is loaded.

Last 11 Read Drive List indicated as Field FL11 has the structure as shown in FIG. 8, and the Last Read Drive List stores the serial number of the tape streaming drive 10 which has read the data recorded in the magnetic tape 3 loaded to the tape cassette 1. As shown in the table of FIG. 8, it is configured so as to be able to store 11 serial numbers like Drive Serial number 1 as the latest drive, then 2, 3, 4, . . . Accordingly, eleven tape streaming drives by which the data of the magnetic tape 3 was reproduced may be identified by tracing back to the past in this case.

Last 11 Write Drive List indicated as Field FL12 has the structure as shown in FIG. 9, and the Last Read Write Drive List stores the serial number of the tape streaming drive 10 which has recorded data to the magnetic tape 3 loaded to the tape cassette 1. That is, similar to the Last 11 Read Drive List, it is configured so as to be able to store 11 serial numbers for example like Drive Serial number 1 as the latest drive, then 2, 3, 4, . . . Accordingly, eleven tape streaming drives by which the data was recorded to the magnetic tape 3 may be identified by tracing back to the past in this case.

Figure 10:
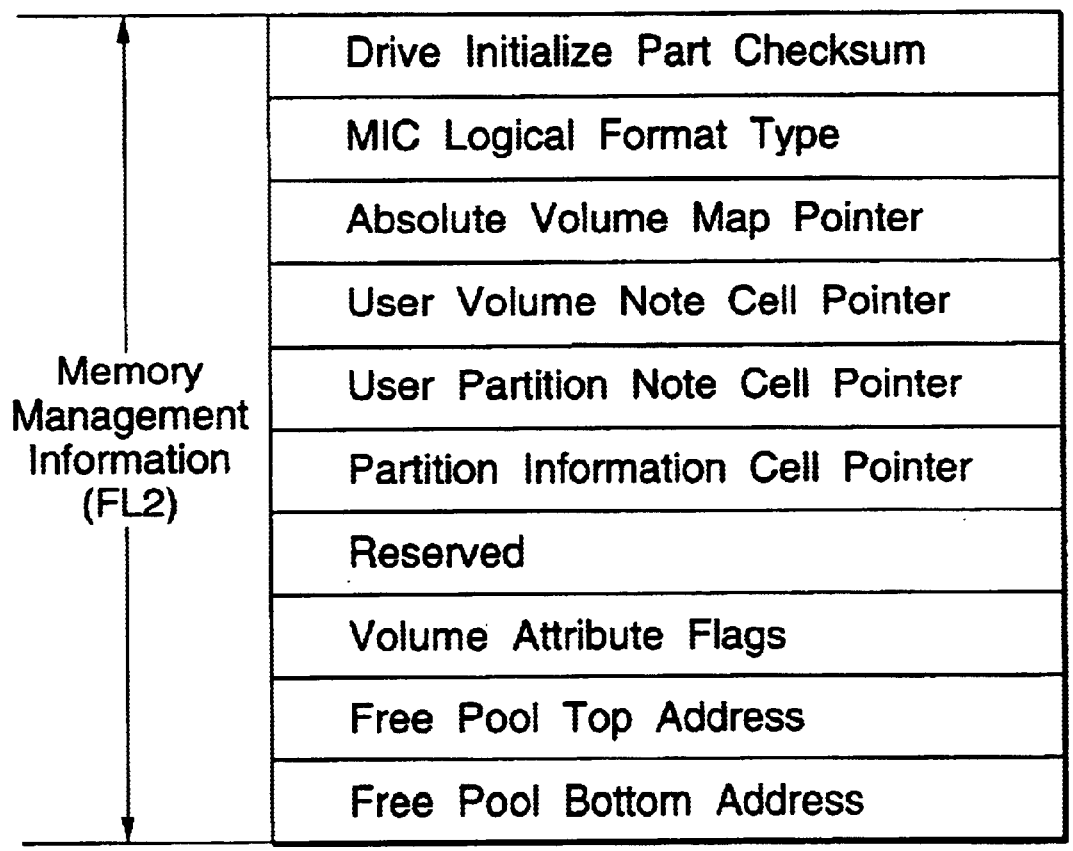
FIG. 10 is a table for explaining Memory Management Information of the MIC of the embodiment of the present invention.

Now, the structure of memory management information of Field FL2 in FIG. 6 will be explained with reference to FIG. 10, in which information on checksum for data of the memory management information which is the drive initialize part is stored in Memory Management Information as Drive Initialize Part Checksum at first. Then, information from MIC Logical Format Type to Free Pool Bottom Address is described as actual data composing Memory Management Information.

At first, ID number of a logical format of the MIC is stored as MIC Logical Format Type. Beside the fundamental MIC format, there exists various MIC formats related to a firmware update tape MIC format, a reference tape MIC format and a cleaning cassette MIC format for example. Then, ID number corresponding to the MIC format of the tape cassette concerned is indicated therein.

A pointer indicating the head address of the area of Super High Speed Search Map Cell in FIG. 6 is disposed in Absolute Volume Map Pointer. User Volume Note Cell Pointer indicates a storage area from/to which the user can read/write freely from/to the tape cassette via the SCSI, that is, the starting address of User Volume Note Cell shown in FIG. 6. User Partition Note Cell Pointer indicates a storage area where the user can read/write freely from/to each partition via the SCSI, i.e., the starting address of User Partition Note Cell in FIG. 6. It is noted that while there is a case when a plurality of User Partition Note Cells are stored, the User Partition Note Cell Point indicates the starting address of the head cell among the plurality of User Partition Note Cells. Partition Information Cell Pointer indicates the starting address of Partition Information Cell #0 in FIG. 6.

While partition information written to the memory free pool is formed only by a number of Partitions formed on the magnetic tape 3, all Partition Information Cells #0 through #N are linked by the pointers by the link structure. That is, the Partition Information Cell pointer is a route indicating the address of Partition #0 and the pointer of Partition Information Cell thereafter is disposed within the previous Partition Information Cell.

The position of each data within Field FL4 is managed by the respective pointers, which are Absolute Volume Map Pointer, User Volume Note Cell Pointer, User Partition Note Cell Pointer and Partition Information Cell Pointer, as described above.

Volume Attribute Flags are flags for providing logical write inhibit tab to the MIC. That is, the contents of the MIC header flag indicates write enable/inhibit of the manufacture part portion or write enable/inhibit of a portion other than the manufacture part. Free Pool Top Address and Free Pool Bottom Address indicate the starting and ending addresses of the memory free pool in Field FL2 at that time. Because the area as the memory free pool changes corresponding to data written or erased such as Partition Information and User Partition Note, Free Pool Top Address and Free Pool Bottom Address are updated correspondingly.

Next, the structure of Volume Tag in Field FL 3 in FIG. 6 will be explained with reference to FIG. 11, in which information on checksum for data in Volume Information in which the fundamental management information of the whole tape cassette is stored is stored at the head of the Volume Tag as Volume Information Checksum.

Further, information on checksum for data in Accumulative Partition Information in which history information since the time that the tape cassette was manufactured is stored as Accumulative Partition Information Checksum. Accumulative Partition Information is formed by the history information in which each data shown in Partition described later is accumulated and is arranged so as not to be erased even when the tape cassette 1 is formatted.

Serial numbers of 32 characters based on ASCII code are stored in Cartridge Serial Number following Volume Note Checksum and Volume Note. A code number of the manufacturer of the tape cassette 1 is stored in Manufacturer ID as a manufacturer identifier. Secondary ID is a secondary identifier corresponding to the type of the tape cassette 1 wherein attribute information of the tape is stored as a code value. Cartridge Serial Number Part Checksum is checksum information of the Cartridge Serial Number, Manufacturer ID and Secondary ID. Each area of Specific Volume Tags 1 through 13 is formed as reserve.

In this embodiment, each information shown in FIG. 12 is stored in Volume Tags shown in Field FL31, in which checksum information for the data in Field FL31 is stored in Field FL311 as checksum of Specific Volume Tag 3.

Five characters may be stored as a character string for identifying the manufacturer of the magnetic tape 3 in Field FL312. For example, when the manufacturer of the magnetic tape 3 is "ABC Company," three characters of "ABC" are stored and the remaining area is set as blank information. When the name of the manufacturer is composed of five characters or more, the head five characters are stored. When there exists the same character string, it may be shorted to allow its identification.

The lot number of the tape cassette 1 in Field FL313 stores the same information of the lot number printed on certain position of the case of the tape cassette 1. The manufactured or obtained date of the magnetic tape 3 in Field FL314 may be indicated, for example, as "YY", "MM" and "DD" in the same manner with Cassette Manufacture Date. Identifier indicating the manufacturing method of the magnetic tape in FL315 stores "000B" when the magnetic tape 3 is manufactured by means of advanced metal envelope, for example, and "001B" when manufactured by means of metal powder, for example.

Electrical characteristics of the magnetic tape in Field FL316, which relate to a reproducing output value of the reference signal, stores a value in which a decimal point of a measured value uniquely determined by an integer part and a decimal part like "0.0 decibel" is shifted to the right by one digit as a one byte binary number. For instance, when the measured value is 12.45 decibel, a value of "125" is stored by rounding the measured value as 12.5 decibel and shifting it's decimal point to the right by one digit.

Next, the cell stored in Field FL4 shown in FIG. 6 will be explained. Partition Information Cells, User Partition Note Cells and others are stored in Field FL4 as described before.

Figure 13:
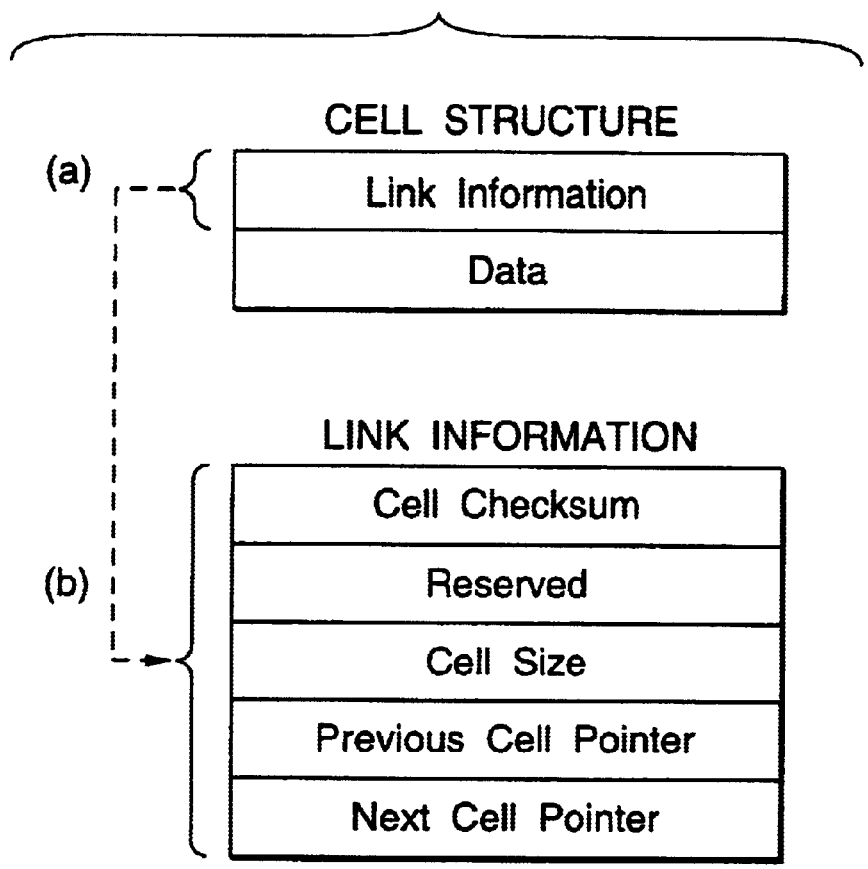
FIG. 13 at (*a*) and (*b*) are tables for explaining the cell structure of the MIC of the embodiment of the present invention.

FIG. 13 shows the structure of each of these cells, in which one cell is composed of Link Information and Data of n bytes, which differs depending on the type of a cell, as shown at (a) in FIG. 13.

Link Information is provided in each cell and has the structure as shown at (b) in FIG. 13. Cell Checksum is provided at first as a checksum concerning to data within the cell. Further, the size of the cell is represented as Cell Size. Previous Cell Pointer and Next Cell Pointer are actual linkage data, that is, data configuring the link structure, and the previous and next cells are designated by the previous cell pointer and the next cell pointer in linking a plurality of cells of the same kind.

There exist Partition Information Cell, Super High Speed Search Map Cell, User Volume Note Cell and User Partition Note Cell as cells having such structure. The cell size of the Partition Information Cell is fixed, whereas the cell size of the other cells is variable.

Figure 14:
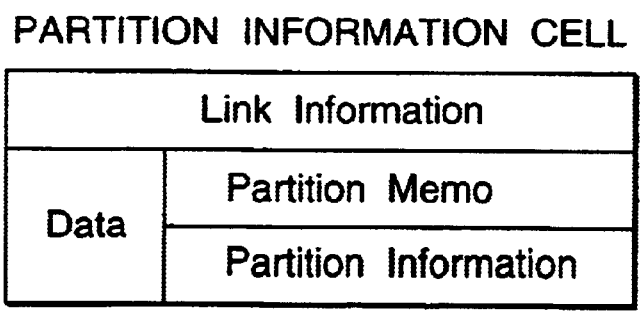
FIG. 14 is a table for explaining a Partition Information Cell of the MIC of the embodiment of the present invention.

Partition Information Cell whose cell size is fixed will be explained with reference to FIGS. 14 and 15, in which the Partition Information Cell is formed of Link Information and data which is formed of Partition Memo and Partition Information, as shown in FIG. 14.

Various information on the history of use of the magnetic tape 3 in a Partition to which that cell corresponds is stored in this Partition Information or System Log to be used by the tape streaming drive as information for managing the recording/reproducing operations thereof.

The data structure of Partition Information within one Partition Information Cell corresponding to a certain Partition is defined as shown in FIG. 15, in which Previous Groups Written indicates information on the number of groups within a partition concerned physically recorded on the magnetic tape 3 counting from when Partition Information concerned has been updated last. Total Groups Written indicates a total number of groups having been recorded in the Partition so far. This value is accumulated until when the life of the tape cassette ends and is disabled or discarded. When data is being recorded in the magnetic tape 3 by the tape streaming drive, the value of that area is incremented corresponding to the number of groups recorded newly by the current recording operation to these Previous Groups Written and Total Groups Written by the process of the system controller 15 of the tape streaming drive.

Previous Groups Read indicates the number of groups physically read counting from when Partition Information concerned has been updated last. Total Groups Read indicates a value to which the number of groups read from the Partition concerned is accumulated. Total Rewritten Frames indicates a value obtained by accumulating the number of frames in which rewriting of data is requested based on READ-AFTER-WRITE, abbreviated as RAW herein below, in Partition concerned.

The tape streaming drive 10 is arranged so as to read data of a frame written to the magnetic tape 3 as the RAW operation right after that by the reproducing head 13C. Then, the system controller 15 detects an error in the data of the frame read by RAW and when it detects an occurrence of an error, it controls the recording system so as to rewrite the data of the frame where the error has occurred. Total Rewritten Frame indicates an accumulated value of the number of frames to which data is rewritten as described above.

Total 3rd ECC Count indicates a value obtained by accumulating the number of groups in which errors were corrected by using the C3 parity in Partition concerned. While errors of data read out of the magnetic tape 3 are corrected by Parities of C1, C2, and C3 in the tape streaming drive system of the present embodiment, the C3 Parity is used when the data cannot be restored by the C1 and C2 Parities.

Access Count indicates the number of times of access of the tape streaming drive to Partition concerned on the magnetic tape 3. The access here means the number of times of physically passing the partition concerned, that is, it includes the number of times that data was recorded/reproduced to/from the partition and the number of times that the partition was passed. Update Replace Count indicates information on an accumulated number of times when data has been rewritten to the magnetic tape 3 by update. That is, it is the number of updating times of the partition concerned. Previous Rewritten Frames indicates information on the number of frames within Partition in which data rewriting has been requested counting from the time when Partition Information concerned was updated last by RAW described before. Previous 3rd ECC Count indicates the number of groups in which errors have been corrected by using the C3 Parity counting from the time when Partition Information concerned was updated last. Load Count indicates a value of an accumulated number of times of loading of the tape. Valid Maximum Absolute Frame Number indicates information on a frame count up to the last frame effective in the partition concerned.

With respect to that, Maximum Absolute Frame Number at the end of Partition Information indicates information on the last frame count of the partition concerned.

Partition Attribute Flag defines the contents of flag for each bit as follows. That is, flags indicating write enable/inhibit to the partition concerned, read enable/inhibit from the partition concerned, rewrite enable/inhibit data based on RAW during recording and retry enable/inhibit to read data during reproduction are prepared as Prevent Write Flag, Prevent Read Flag, Prevent Write Retry Flag and Prevent Read Retry Flag, respectively. Further, a flag which is set during recording to the partition concerned and is reset in response to the end of the recording is prepared as Partition Open Close Flag.

Super High Speed Search Map Cell formed at the rear end of Field FL4 shown in FIG. 6 has the cell structure accompanying Link Information similar to Partition Information and is data map information necessary for realizing the high speed search function utilizing the performance of the reel motors at maximum without obtaining ID information in real-time from the magnetic tape 3.

While the data structure within the MIC is constructed as explained above with reference to FIGS. 6 through 15, such data structure of the MIC is merely an example, and the disposition of data, setting of the areas, the contents of the data, the data size and the like are not limited to those described above.

FIGS. 16(*a*)–16(*c*) explain the structure of "Knowledge Information". It is noted that the knowledge information will be referred to as a "knowledge unit" in indicating each individual knowledge information and as a "whole knowledge" in indicating a plurality of knowledge units composing the knowledge information.

A knowledge unit comprises operation specifying information and conditional information as shown in FIG. 16(*a*), and the operation specifying information comprises an operational command and an operational variable, for example.

FIG. 17 shows the contents of the operational command. The contents indicated as mnemonic may be selected by a command code. Then, the contents selected by the command code is executed based on the value set in the operational variable. For instance, when the frequency in use of the cleaning roller is to be set, "the frequency in use of the cleaning roller is set by the rate or percentage indicated by a variable to an initial or standard value set in advance in firmware" by setting the command code as "21h".

Accordingly, when "40" is set as the value in the operational variable, the frequency in use of the cleaning roller is set so as to be 40% to the standard value.

Besides that, it is possible to select operations corresponding to the characteristics of the magnetic tape 3 like "22h" and "23h" as an upper limit of the number of retries in writing or reading data or "24h" in setting a current value in writing data in the RF processing section 19. Further, for the MIC for example, it is possible to set "28h" as an upper limit of the number of retries in re-contacting the contact type memory 104 or to set "2Ah" as carrier frequency of the non-contact type remote memory chip 4 so as to be able to execute in the state when the numerical value of the operational variable is set.

The conditional information shown in FIG. 16(a) is composed of items such as a conditional value (1), a conditional operator (1), information specification, a conditional operator (2), and a conditional value (2). The conditional values (1) and (2) are information for identifying the type of the tape cassette 1 and the magnetic tape 3 such as the name of manufacturer, the lot number and the like.

The information specification is information for specifying which information stored in the MIC should be applied to the conditional information and items shown in FIG. 18 may be cited as one example thereof. For instance, when the character string shown in FIG. 12 for identifying a manufacturer of the magnetic tape stored in the MIC is applied as information specification, the magnetic tape manufacturer "3Eh" indicated in Item L2 is set. In the same manner, when the electrical characteristic of the magnetic tape, that is, the reproducing output value of a reference signal is applied as information specification, the magnetic tape electrical characteristic value "3Fh" indicated in Item L2 is set. When the lot number of the tape cassette is to be applied, the tape cassette lot number "40h" indicated in Item L3 is set.

While FIG. 18 also shows information specifications corresponding to the respective data items stored in Manufacturer Information and Accumulative System Log of the MIC besides those described above, Physical Tape Characteristic ID "1Eh" is set for example when information of Physical Tape Characteristic ID stored in the MIC is applied as the information specification.

The conditional operators (1) and (2) are "=" (10h), ">" (12h), "(" (14h) "(" (18h) and the like for example as shown in FIG. 19. The conditional values (1) and (2) may be compared with the information specification by setting the conditional values (1) and (2). It is noted that "NOP" (00h) is set when no computation is carried out in the knowledge unit.

While the knowledge unit becomes data for executing operations by evaluating based on certain conditions as described above, (a) in FIG. 20 shows it based on data length. That is, the contents shown in FIGS. 17 through 19 are set appropriately as for the command information, information specifications and conditional operators and the conditional values (1) and (2) are what data of a number of bytes shown in data length of the conditional values (1) and (2) are arrayed. While in practice a plurality of knowledge units are constructed as necessary, it turns out as shown at (b) in FIG. 20 in such a case. That is, the whole knowledge is constructed by a total number of knowledge units, that is, it is data of variable length corresponding to the number of knowledge units.

Thus, the whole knowledge composed of a plurality of knowledge units is constructed as variable length data and is managed together with the operational command, information specification and conditional operators shown in FIGS. 17 through 19.

It is noted that when data length of the conditional values (1) and (2) shown at (a) in FIG. 20 is "0", it means that there is no condition.

While the knowledge unit is constructed as shown in FIG. 16(a), some cases corresponding to the actual states of use will be explained according to FIGS. 16(b) and (c).

When the magnetic tape 3 manufactured by "A Company" is to be used in the tape streaming drive 10 and when it is found that the head is liable to be contaminated due to its nature for example, it is advantageous if the tape streaming drive 10 has the knowledge unit which doubles the frequency in use of the cleaning roller 46 for example as shown in FIG. 16(b) to suppress the contamination of the head.

In this case, "21h" is set as the operational command in the operation specifying information and "200" is set for example as the operational variable. Further, the name of the manufacturer "A Company" is set as the conditional value (1), "=" is set as the conditional operator (1) and the name of the manufacturer read from the MIC corresponds to the information specification. It is noted that the case shown in FIG. 16(b) shows a state in which no content is specified for the conditional operator (2) and the conditional value (2).

The knowledge unit shown in FIG. 16(b) is evaluated in the state in which the name of the manufacturer read from the MIC is accommodated to the knowledge unit. When the result of the evaluation is "True" as "the conditional value (1)=information specification" holds, a control is made so as to execute the operation shown in the operation specifying information. That is, for the tape cassette 1 manufactured by "A Company", the control is executed so as to double the frequency in use of the cleaning roller to the standard value. Then, the next knowledge unit in the whole knowledge is evaluated. When the result of the evaluation is "False," the frequency in use of the cleaning roller set at the standard value remains as it is and the next knowledge unit is evaluated.

Thus, the all knowledge units of the tape streaming drive 10 are evaluated. It is noted that the operation corresponding to the operational command corresponding to the knowledge unit whose evaluation result has been "False" is based on information set in the firmware. That is, only the knowledge unit evaluated as "True" as a result is applied as information for operating corresponding to the tape cassette 1.

When the tape cassette 1 of a certain lot number is to be used in the tape streaming drive 10 and it is found that the head is liable to be contaminated due to its problematic nature for example, it will do if the tape streaming drive 10 has the knowledge unit as shown in FIG. 16(c).

Again in this case, "21h" is set as the operational command and "200" is set for example as the operational variable. Then, the lot number "T3CB0522" is set as the conditional value (1), "<" is set as the conditional operator (1), the lot number read from the MIC corresponds to the information specification, "<" is set for the conditional operator (2) and the lot number "T3CB1150" is set for the conditional value (2).

Moreover, the knowledge unit is evaluated in the state where the lot number of the tape cassette 1 read from the MIC corresponds and when the result of the evaluation turns out to be "True" as "conditional value (1)<information specification <conditional value (2)" holds, and a control is made so as to execute the operation indicated by the operation specifying information. That is, in the tape cassette 1 which has a lot number greater than "T3CB0522" and smaller than "T3CB1150", the frequency of use of the cleaning roller is doubled compared to the standard value, for example. Then, the next knowledge unit in the whole knowledge is evaluated. When the result of the evaluation turns out to be "False", the next knowledge unit is evaluated while keeping the frequency of use of the cleaning roller at the standard value.

When the result of the evaluation turns out to be "True" as described above, the frequency in use of the cleaning roller 46 is doubled compared to the reference value during the tape cassette 1 being loaded. Accordingly, the contamination of the head may be removed efficiently, thus allowing good recording/reproducing operations.

While the case of increasing the frequency in use of the cleaning roller 46 in using the magnetic tape 3 which had been considered to be inferior has been cited in FIGS. 16(*b*) and (*c*), it is possible to lower the frequency in use of the cleaning roller 46 when a good magnetic tape 3 is used. In this case, the frequency in use of the cleaning roller 46 may be set at 40% of the standard value when the tape cassette 1 applicable to the conditional information is loaded by having a knowledge unit with an operational variable shown in FIGS. 16(*b*) and 16(*c*) of "40."

It is noted that the operational specification set by the evaluation of the knowledge unit is reset after discharge of the tape cassette 1 and is returned again to the reference value. That is, the evaluation of the knowledge unit is executed every time when the tape cassette 1 is loaded and certain operational controls corresponding to the tape cassette 1 concerned may be executed.

FIG. 21 is a diagram showing the transition in evaluating the knowledge units corresponding to the tape cassette 1 by functional blocks. It is noted that in FIG. 21, Knowledge A, Knowledge B, Knowledge C, . . . correspond to the knowledge units described above and are stored in a knowledge information storage area 25*a* formed in the flash ROM 25.

At first, it is detected whether the tape cassette 1 has been loaded in the tape streaming drive 10 as a tape cassette insertion detecting process ST1. Then, detecting that the tape cassette 1 has been loaded, data stored in the MIC provided in the tape cassette 1 is read as a data reading process ST2. Thereby, the data stored in the MIC is stored in the SRAM 24, for example.

Then, Knowledge (A, B, C, . . . ) stored in the flash ROM 25 for example are evaluated one after another as a true and false evaluating process ST3. Here, while a sampling process ST4 for sampling information specification as tape cassette identification information, for example, the name of the manufacturer, read in the reading process ST2 and stored in the SRAM 24 is carried out as information for identifying the tape cassette 1 for the evaluation, the sampled information specification corresponds to a knowledge unit to be evaluated. Thereby, the knowledge units as shown in FIGS. 16(*b*) and 16(*c*) may be formed.

Then, evaluation is carried out in each knowledge unit and when the result of the evaluation is "True", an operational controlling process ST5 based on the operational specification indicated in that knowledge unit is carried out. When the result of the evaluation is "False", an operation based on the firmware is carried out as the operation related to that knowledge unit.

Then, the operation corresponding to the type, for example, the name of manufacturer, of the tape cassette 1 currently inserted may be carried out in the tape streaming drive 10 by evaluating in such order, Knowledge A, Knowledge B, Knowledge C, . . . and so on in the true and false evaluating process ST3.

Figure 22:
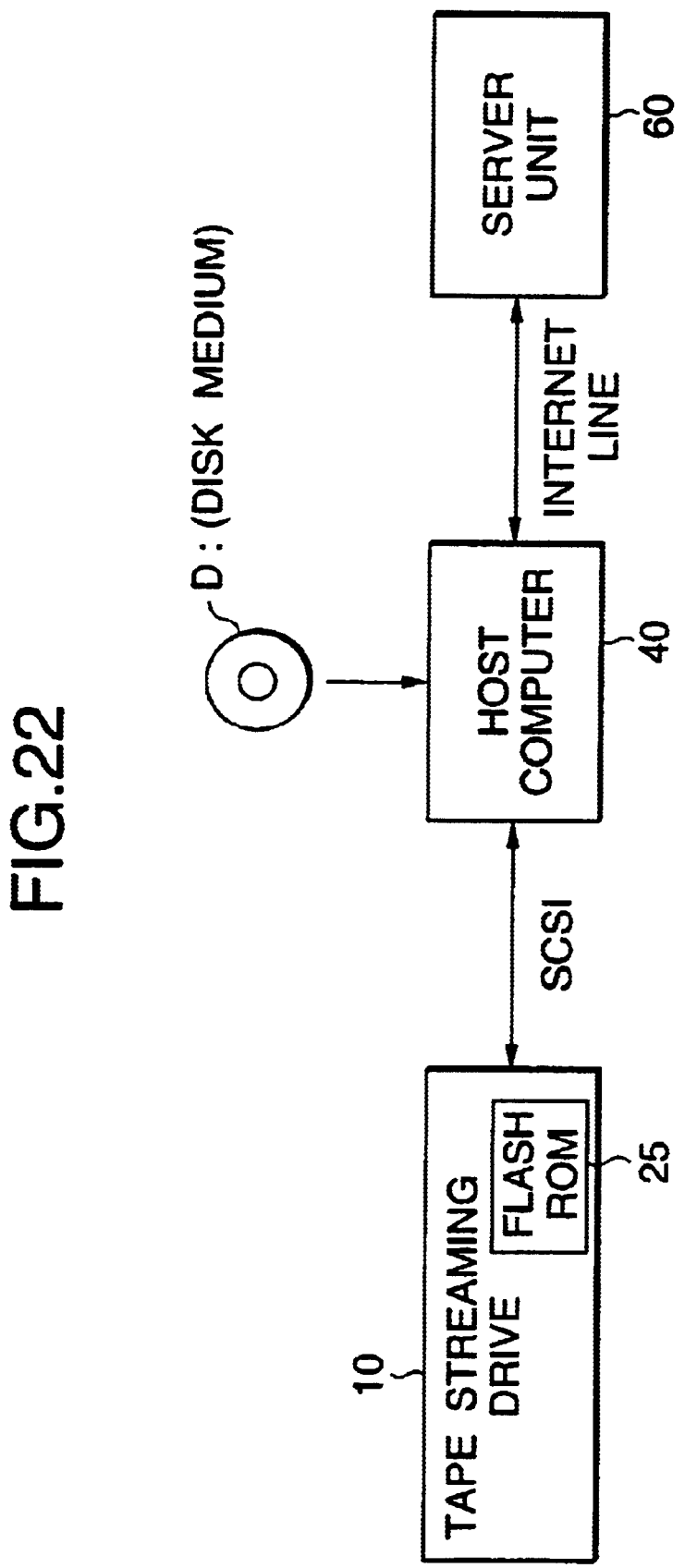
FIG. 22 is a block diagram of a system for use when knowledge information storage area is to be updated.

Then knowledge information of the tape cassette 1 stored in the flash ROM 25 may be updated on occasion as shown in FIG. 22, for example. For instance, it is conceivable to overwrite and update the knowledge information storage area 25*a* in the flash ROM 25 via the host computer 40.

When the latest knowledge information is stored in a recording medium, such as a disk medium D, the updating process such as overwriting the information may be carried out by causing the tape streaming drive 10 to read the knowledge information read by the host computer 40. Or, the updating process may be carried out by the knowledge information downloaded by the host computer 40 from a predetermined server system 60 via an Internet line or the like. In this case, the system controller 15 implements the updating process to the recording area in the flash ROM 25 where the knowledge information is stored.

That is, the tape streaming drive 10 can update the knowledge information by obtaining the knowledge information via the host computer 40 and by having the processing means capable of updating the certain recording area in the flash ROM 25. Accordingly, when the disk medium D or the server unit 60 stores knowledge information newer than the current knowledge information of the tape streaming drive 10, the tape streaming drive 10 can obtain and apply that knowledge information.

Still more, it is possible to add and store the new knowledge unit in the flash ROM 25. That is, even when a new knowledge unit is required by the tape streaming drive 10, the increase of knowledge units may be recommodated if a relatively large area for storing knowledge information is prepared in the flash ROM. It is also possible to delete unnecessary knowledge units to maintain the storage area.

It is also possible to provide an individual memory storing only knowledge information and to obtain new knowledge by replacing the memory itself instead of updating the knowledge information storage area 25*a* of the flash ROM 25.

Thus, the tape streaming drive 10 can update the knowledge corresponding to the characteristics of the tape cassettes available in the market at any time.

One example of the condition for constructing the knowledge unit will be explained below.

Figure 23A:
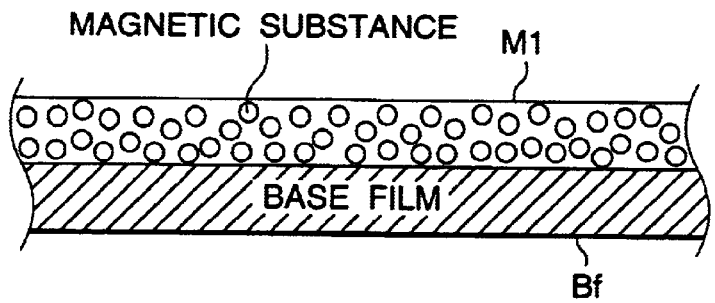
FIGS. 23(*a*), 23(*b*) and 23(*c*) exemplify a case when the state of the magnetic tape is coarse to explain the knowledge units corresponding to such a case.
Figure 23B:
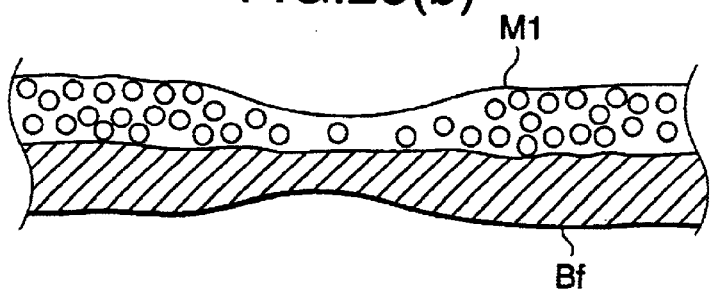
Figure 23C:
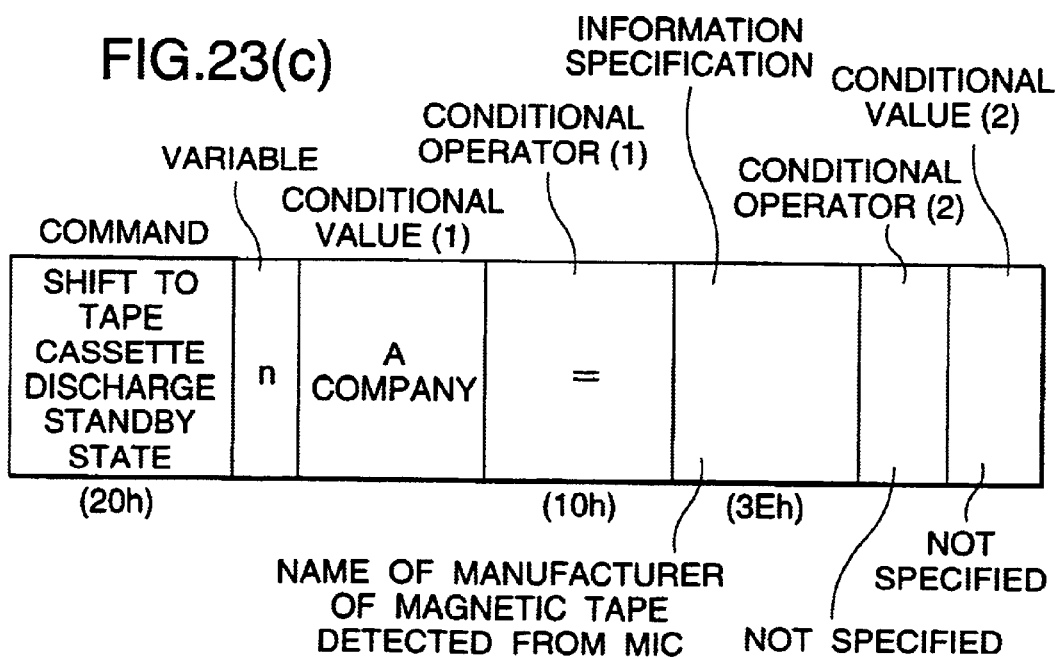

For instance, FIG. 23(*a*) is a diagrammatic view sectionally showing a part of the magnetic tape 3, that is, a base film Bf and a magnetic layer M1 formed on the base film Bf. In the example of the figure, it can be seen that the magnetic tape 3 is normal and the thickness of the base film Bf and the magnetic layer M1 is almost uniform. Still more, the density of magnetic substances indicated by small circles in the magnetic layer M1 is also uniform. In such a state, data may be recorded/reproduced well to/from the magnetic tape 3.

There is a case, however, when the magnetic tape 3 is formed as shown in FIG. 23(*b*) for some reason during its production. In the tape shown in FIG. 23(*b*), because the thickness of the base film Bf and the magnetic layer M1 is not uniform, the density of the magnetic substances in the magnetic layer M1 also varies and data may not be recorded/reproduced.

Accordingly, when it has been found in advance that the magnetic tape 3 manufactured by a certain manufacturer is defective as shown in FIG. 23(*b*), it is sufficient if knowledge as shown in FIG. 23(*c*) is constructed.

In this case, "shift to the tape cassette discharge standby state" (2Dh) shown in FIG. 17 is set as the operational command.

As the conditional information, "A Company", that is, the manufacturer is set as the conditional value (1), "=" is set as the conditional operator (1) and the name of manufacturer of the magnetic tape 3 detected from the MIC is accommodated to the information specification.

Thereby, when the tape cassette in which the magnetic tape 3 manufactured by the "A Company" for example is used is loaded to the tape streaming drive 10, the system controller 15 shifts to the standby state for ejecting the tape cassette 1 without shifting to the normal operation. Thereby, it is possible so as not to record/reproduce data to/from the tape cassette 1 whose magnetic tape 3 is found to be defective.

It is noted that in this case, it is possible to arrange to notify the host computer 40 that the tape streaming drive 10 is shifted to the tape cassette discharge standby state. Thereby, the host computer 40 can understand the status of the tape streaming drive 10 and can inform the user to urge the discharge of the tape cassette.

Figure 24A:
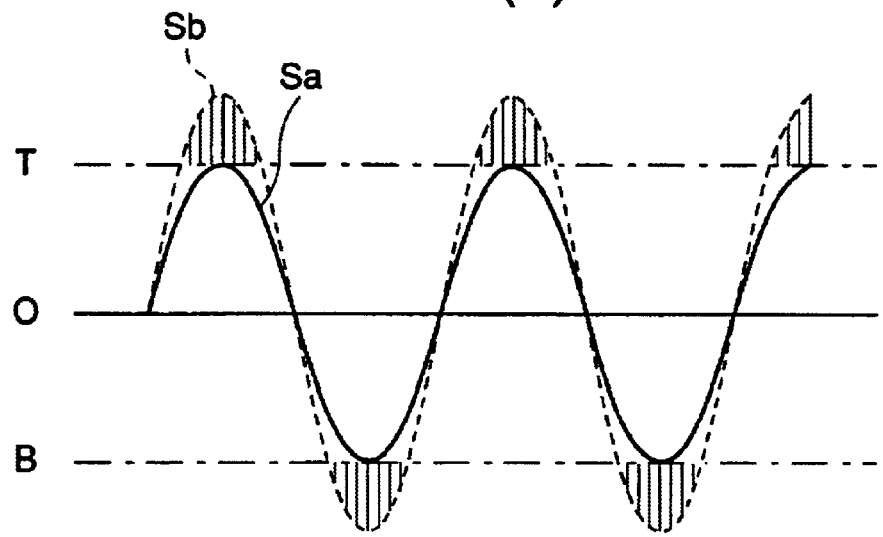
FIGS. 24(*a*) and 24(*b*) exemplify a case of adjusting a gain of the magnetic tape to explain the knowledge unit corresponding to such a case.
Figure 24B:
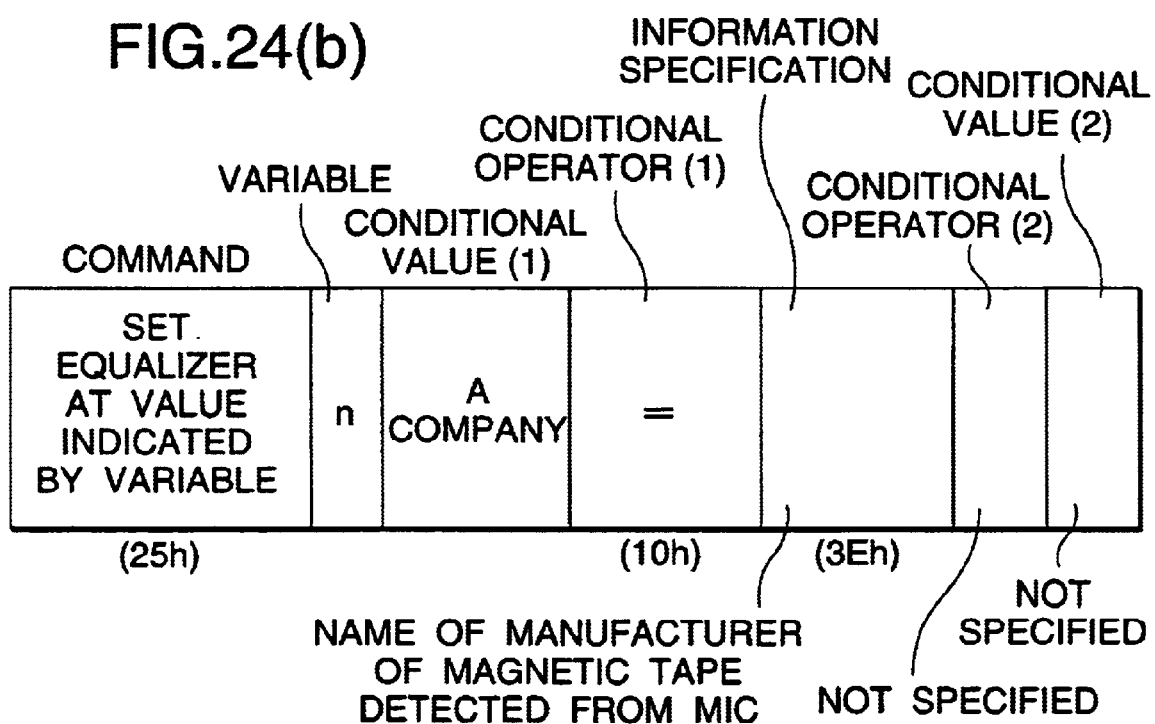

Further, a signal level indicated by a solid line Sa in FIG. 24(a) is supposed to be a reference level of a reproduced signal in the RF processing section 19. That is, supposing that the level of the signal read form the magnetic tape has an amplitude in the scope indicated by dashed lines T and B, the RF processing section 19 regulates a gain by the firmware, for example. The level of the reproduced signal, however, happens to be excessive in a magnetic tape manufactured by a certain manufacturer as indicated by a broken line Sb and data in the hatched part cannot be detected by the gain characteristic set in the RF processing section 19. In this case, the signal indicated by the broken line Sb may be correlated with the level indicated by the solid line Sa by regulating the gain of the RF processing section 19. That is, it is sufficient if knowledge as shown in FIG. 24(b) is constructed.

"Set equalizer at a value indicated by variable" (25h) is set as the operational command and a numerical value n of less than "100" for reducing the gain is set as the operational variable. Moreover, "A Company", that is, the manufacturer, is set as the conditional value (1), "=" is set as the conditional operator (1) and the name of manufacturer of the magnetic tape 3 detected from the MIC is correlated to the information specification as the conditional information.

Thereby, when the tape cassette in which the magnetic tape 3 manufactured by the "A Company" is used is loaded to the tape streaming drive 10, the reproduced signal may be detected accurately by regulating the gain so that the level may correspond to that indicated by the solid line Sa. It is noted that the gain may be regulated to be high when the tape cassette 1 corresponding to the conditional information is loaded by setting the operational variable shown in FIG. 24(b) so as to increase the gain. That is, in contrast with the case described above, data may be reproduced well even from a magnetic tape whose reproducing level is lower than the reference level.

It is also possible to arrange so as to only read from a tape cassette, to which data was recorded before by the tape streaming drive, manufactured by a certain manufacturer. In this case, the serial number of the tape streaming drive is set as the conditional value (1) and the drive serial number of the Last Write 11 Drive List stored in the MIC for example is correlated to the information specification. Because Last Write 11 Drive List is composed of 11 tables, as described before, the serial numbers stored in the drive serial numbers 1 thorough 11 are evaluated one after another and the mode is shifted to the mode of carrying out only reproduction at the point of time when the valuation turns out to be "True".

That is, when a command for executing recording for example is supplied from the host computer 40 under such circumstance, the tape cassette 1 is shifted to the discharge standby state without executing the recording operation. When the evaluation of all serial numbers turns out to be "False", the evaluation is shifted to the other knowledge if any.

It is noted also in this case, the host computer 40 can urge the user to discharge the tape cassette by notifying it that the mode is shifted to the state of executing only reproduction from the tape cassette 1 concerned.

Thus, the user can carry out an operation corresponding to the tape cassette 1 based on the result of evaluation of knowledge even when the user has loaded the tape cassette 1 to the tape streaming drive 10 without being aware of the type thereof.

It is noted that the certain operation identifying the tape cassette, such as the control of frequency in use of the cleaning roller 46, is merely an example and various operations corresponding to the tape cassette may be realized depending on the structure of the knowledge.

As described above, according to the present invention, the tape driving apparatus is arranged so as to be able to carry out a required operational control by evaluating knowledge information stored in the tape driving apparatus in advance based on the identifying information, such as the name of manufacturer of the magnetic tape, the lot number and other information, of the tape cassette detected from the memory MIC fitted in the loaded tape cassette. Thereby, the tape driving apparatus can carry out the required operation corresponding to the loaded tape cassette.

That is, when a tape cassette with a magnetic tape manufactured by a certain manufacturer is loaded, for example, it becomes possible to increase (or to reduce) the frequency in use of the cleaning roller.

The tape driving apparatus is also arranged so as to be able to obtain knowledge information from the external apparatus such as a host computer via a disk medium and Internet line. Thereby, even when a new tape cassette becomes prevalent in the market for example, it becomes possible to obtain knowledge information concerning that tape cassette by updating the knowledge information and to realize a required operational control corresponding to that tape cassette in the tape driving apparatus.

Still more, new knowledge information may be obtained by constructing knowledge information storage means with an individual memory element in which the knowledge information is stored and just by replacing knowledge information storage means without utilizing the external apparatus such as the host computer.

What is claimed is:

1. A tape driving apparatus, comprising:
   tape driving means for running a magnetic tape included in a tape cassette and for recording/reproducing information to/from said magnetic tape;
   memory driving means for reading/writing management information from/to a memory by implementing a predetermined communicating process, said memory being located at said tape cassette for storing said management information for managing a recording/reproducing operation to/from said magnetic tape;
   identification information detecting means for detecting identification information of said tape cassette from said memory;
   knowledge information storage means, included in said tape driving apparatus, for storing knowledge information formed of operation specifying information and conditional information corresponding to the identification information of said tape cassette;
   evaluating means for evaluating said knowledge information based on said identification information;
   a controller for controlling a predetermined operation corresponding to said operation specifying information based on a result of evaluation of said evaluating means;

input means for inputting additional knowledge information from outside the tape driving apparatus; and knowledge information updating means for updating the knowledge information stored in said knowledge information storage means with said additional knowledge information inputted from the outside via said input means.

2. The tape driving apparatus according to claim 1, wherein said knowledge information storage means comprises a flash read-only memory.

3. The tape driving apparatus according to claim 1, wherein said knowledge information storage means comprises a plurality of memory elements as an individual body storing said knowledge information and said tape streaming drive is constructed so that said memory elements are replaceable.

4. The tape driving apparatus according to claim 1, wherein said identification information includes manufacture information relating to the tape cassette.

5. The tape driving apparatus according to claim 1, wherein said operation specifying information includes information for controlling the tape driving means regardless of whether it performs recording/reproducing of information to/from said magnetic tape.

6. The tape driving apparatus according to claim 1, wherein said operation specifying information includes head cleaning information for controlling head cleaning means for cleaning magnetic heads of the tape driving apparatus.

7. The tape driving apparatus according to claim 1, wherein said operation specifying information includes retry information for setting a number of data writing and/or reading retries.

8. The tape driving apparatus according to claim 1, wherein said operation specifying information includes write condition information for setting a condition of the tape driving apparatus for writing data to the magnetic tape.

9. The tape driving apparatus according to claim 1, wherein said operation specifying information includes read condition information for setting a condition of the tape driving apparatus for reading data from the tape.

10. The tape driving apparatus according to claim 1, wherein said operation specifying information includes read/write information which sets a condition of the tape driving apparatus for writing/reading data to/from the magnetic tape.

11. A tape driving apparatus, comprising:

tape driving means for running a magnetic tape included in a tape cassette and for recording/reproducing information to/from said magnetic tape;

memory driving means for reading/writing management information from/to a memory by implementing a predetermined communicating process, said memory being located at said tape cassette for storing said management information for managing a recording/reproducing operation to/from said magnetic tape;

identification information detecting means for detecting identification information of said tape cassette from said memory;

operation specifying information storage means, included in said tape driving apparatus, for storing operation specifying information corresponding to the identification information of said tape cassette;

a controller for controlling a predetermined operation corresponding to said operation specifying information according to the identification information;

input means for inputting additional operation specifying information from outside the tape driving apparatus; and operation specifying information updating means for updating the operation specifying information stored in said operation specifying information storage means with said additional operation specifying information inputted from the outside via said input means.

12. The tape driving apparatus according to claim 11, wherein said operation specifying information storage means comprises a flash read-only memory.

13. The tape driving apparatus according to claim 11, wherein said operation specifying information storage means comprises a plurality of memory elements as an individual body storing said operation specifying information and said tape streaming drive is constructed so that said memory elements are replaceable.

14. The tape driving apparatus according to claim 11, wherein said identification information includes manufacture information relating to the tape cassette.

15. The tape driving apparatus according to claim 11, wherein said operation specifying information includes head cleaning information which controls head cleaning means for cleaning magnetic heads of the tape driving apparatus.

* * * * *